US012597051B2

(12) United States Patent
Andersen et al.

(10) Patent No.: US 12,597,051 B2
(45) Date of Patent: *Apr. 7, 2026

(54) SYSTEMS AND METHODS FOR THE DISPLAY OF CORRESPONDING CONTENT FOR USER-REQUESTED VEHICLE SERVICES USING DISTRIBUTED ELECTRONIC DEVICES

(71) Applicant: Uber Technologies, Inc., San Francisco, CA (US)

(72) Inventors: Peder Christopher Andersen, Lafayette, CA (US); Kalyan Pabbisetty, San Ramon, CA (US); Garrett Nicholas Spitzer, San Francisco, CA (US); Jeremiah Martin Gelb, Emeryville, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/955,031

(22) Filed: Nov. 21, 2024

(65) Prior Publication Data

US 2025/0156906 A1 May 15, 2025

Related U.S. Application Data

(63) Continuation of application No. 18/485,519, filed on Oct. 12, 2023, now Pat. No. 12,190,354, which is a
(Continued)

(51) Int. Cl.
*G06Q 30/02* (2023.01)
*G01C 21/34* (2006.01)
(Continued)

(52) U.S. Cl.
CPC ..... *G06Q 30/0265* (2013.01); *G01C 21/3438* (2013.01); *G01C 21/3617* (2013.01); *G06Q 30/0261* (2013.01)

(58) Field of Classification Search
CPC ........... G06Q 30/0265; G06Q 30/0261; G01C 21/3438; G01C 21/3617
See application file for complete search history.

(56) References Cited

U.S. PATENT DOCUMENTS

| | | | |
|---|---|---|---|
| 8,011,140 | B2 | 9/2011 | Durham |
| 10,636,335 | B2 | 4/2020 | Kis-Benedek Pinero et al. |

(Continued)

FOREIGN PATENT DOCUMENTS

| | | |
|---|---|---|
| KR | 20030074022 A | 9/2003 |
| WO | WO 2020/123028 | 6/2020 |
| WO | WO 2022/060416 | 3/2022 |

OTHER PUBLICATIONS

Advani, S., Jaladi, B., Lal, A., Nagda, R., & Rampalli, S. Team 26| Adio: Location-based Advertising for Rideshare. (Year: 2020).*
(Continued)

*Primary Examiner* — Waseem Ashraf
*Assistant Examiner* — Christopher C Busch
(74) *Attorney, Agent, or Firm* — Dority & Manning, P.A.

(57) ABSTRACT

Systems and methods for displaying corresponding content for vehicle services using a distributed set of electronic devices are provided. For example, a computer-implemented method includes obtaining data associated with a vehicle service instance. The vehicle service instance is associated with a request for a vehicle service for a user. The method includes determining, based on the data associated with the vehicle service instance, a first advertisement content item for a display device positioned on an exterior of a vehicle assigned to the vehicle service instance and a second advertisement content item for a user device associated with the
(Continued)

vehicle service instance. The method includes communicating data that initiates the display of the first advertisement content item for the display device positioned on the exterior of the vehicle and data that initiates the display of the second advertisement content item for the user device.

17 Claims, 7 Drawing Sheets

Related U.S. Application Data continuation of application No. 17/702,207, filed on Mar. 23, 2022, now Pat. No. 11,830,037.

(51) Int. Cl.
G01C 21/36 (2006.01)
G06Q 30/0251 (2023.01)

(56) References Cited

U.S. PATENT DOCUMENTS

| | | | | |
|---|---|---|---|---|
| 10,796,340 | B2 | 10/2020 | Ta et al. | |
| 10,803,488 | B2 | 10/2020 | Ta et al. | |
| 10,810,628 | B2 | 10/2020 | LaJoie | |
| 10,991,007 | B2 | 4/2021 | Ta et al. | |
| 11,037,199 | B2 | 6/2021 | Ta et al. | |
| 11,055,743 | B2 | 7/2021 | Ta et al. | |
| 11,138,634 | B2 | 10/2021 | Ta et al. | |
| 11,138,635 | B2 | 10/2021 | Ta et al. | |
| 11,138,636 | B2 | 10/2021 | Ta et al. | |
| 11,373,211 | B2 | 6/2022 | Takemura et al. | |
| 2005/0083403 | A1 | 4/2005 | Flores et al. | |
| 2006/0213100 | A1 | 9/2006 | McCann | |
| 2013/0054281 | A1* | 2/2013 | Thakkar | G06Q 30/0207 705/5 |
| 2014/0257989 | A1 | 9/2014 | Prakah-Asante et al. | |
| 2016/0320198 | A1 | 11/2016 | Liu et al. | |
| 2019/0139091 | A1* | 5/2019 | He | B60Q 1/50 |
| 2020/0074849 | A1 | 3/2020 | Demisse et al. | |
| 2020/0160393 | A1 | 5/2020 | Otsuka et al. | |
| 2020/0249042 | A1* | 8/2020 | Warr | G01C 21/3438 |
| 2021/0073825 | A1* | 3/2021 | Walling | G06Q 50/40 |
| 2021/0326933 | A1 | 10/2021 | Angelo | |
| 2021/0390581 | A1* | 12/2021 | Chan | G06V 20/597 |
| 2022/0044272 | A1* | 2/2022 | Gikas | G06Q 30/0222 |

OTHER PUBLICATIONS

Advani, Sneha, Bharath Jaladi, Arjun Lal, Romit Nagda, and Sneha Rampalli. "Team 26. Adio: Location-based Advertising for Rideshare." (https ://fisher.wharton. upenn .edu/wp-content/uploads/2020/09/ Adio-Final-Report-2 .pdf) (Year: 2020).
Brazil Application No. 112021004392, Filed on Oct. 15, 2019, 55 pages.
Canadian Application No. 3110715, Filed Oct. 15, 2019, 29 pages.
Chinese Application No. 2019/80072244, Filed Oct. 15, 2019, 44 pages.
European Application No. 19896537, filed Oct. 15, 2019, 53 pages.
Japanese Application No. 202153030, Filed Oct. 15, 2019, 55 pages.
Korean Application No. 20217016608, Filed on Oct. 14, 2019, 43 pages.
PCT Application No. PCT/US19/56189, Filed on Oct. 15, 2019, 54 pages.
PCT Application No. PCT/US21/26525, Filed on Sep. 4, 2021, 105 pages.
Singapore Application No. 112021033595, Filed Oct. 15, 2019, 55 pages.
U.S. Appl. No. 17/007,575, filed Aug. 31, 2020, 18 pages.
U.S. Appl. No. 17/097,256, filed Nov. 13, 2020, 19 pages.
U.S. Appl. No. 17/168,313, filed Feb. 5, 2021, 22 pages.
U.S. Appl. No. 17/179,574, filed Feb. 19, 2021, 25 pages.
U.S. Appl. No. 17/201,419, filed Mar. 15, 2021, 27 pages.
U.S. Appl. No. 17/230,008, filed Apr. 14, 2021, 19 pages.
U.S. Appl. No. 17/237,268, filed Apr. 22, 2021, 21 pages.
Extended European Search Report for Application No. 23775594.7, mailed Sep. 18, 2025, 8 pages.

* cited by examiner

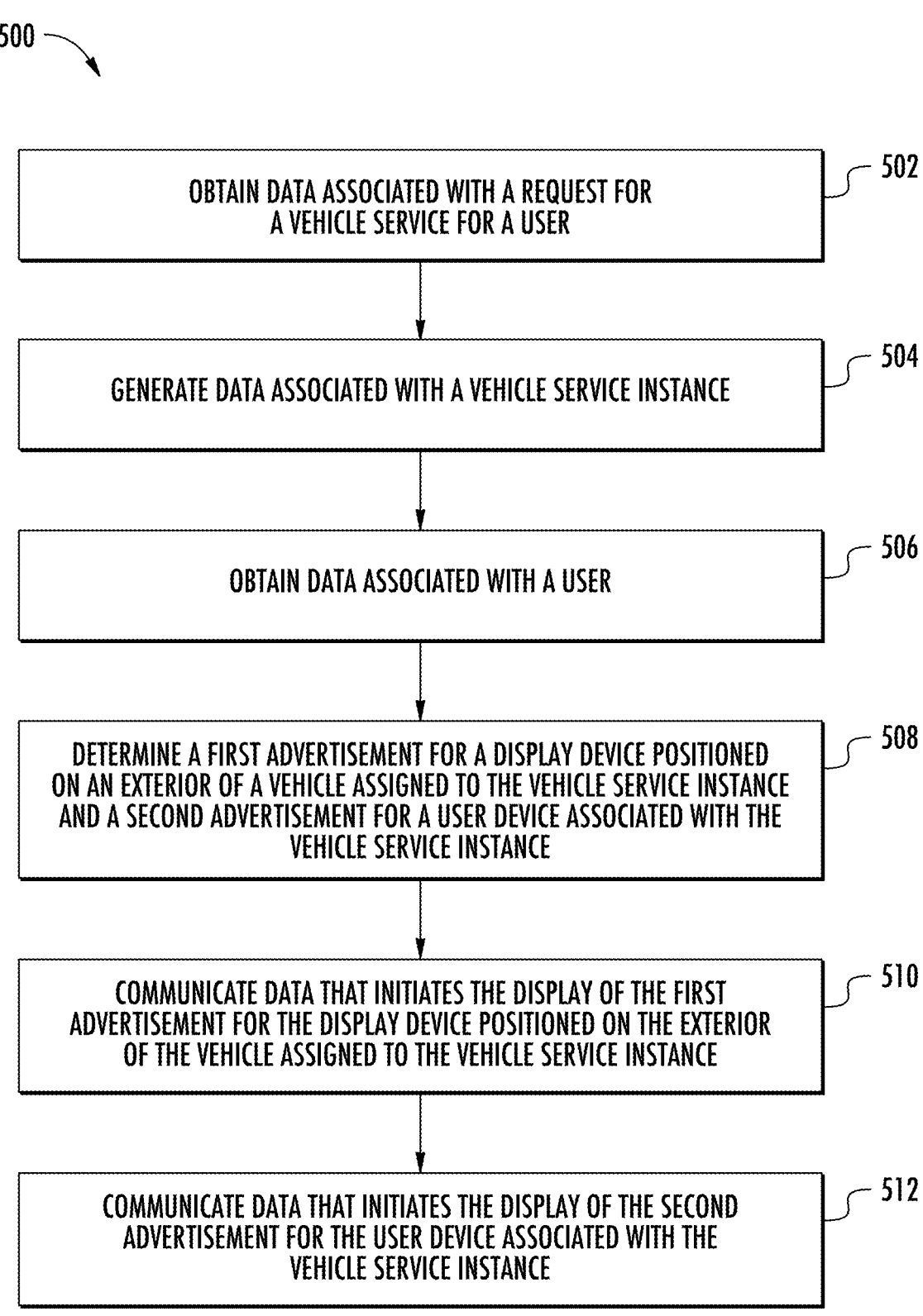

500

502 OBTAIN DATA ASSOCIATED WITH A REQUEST FOR A VEHICLE SERVICE FOR A USER

504 GENERATE DATA ASSOCIATED WITH A VEHICLE SERVICE INSTANCE

506 OBTAIN DATA ASSOCIATED WITH A USER

508 DETERMINE A FIRST ADVERTISEMENT FOR A DISPLAY DEVICE POSITIONED ON AN EXTERIOR OF A VEHICLE ASSIGNED TO THE VEHICLE SERVICE INSTANCE AND A SECOND ADVERTISEMENT FOR A USER DEVICE ASSOCIATED WITH THE VEHICLE SERVICE INSTANCE

510 COMMUNICATE DATA THAT INITIATES THE DISPLAY OF THE FIRST ADVERTISEMENT FOR THE DISPLAY DEVICE POSITIONED ON THE EXTERIOR OF THE VEHICLE ASSIGNED TO THE VEHICLE SERVICE INSTANCE

512 COMMUNICATE DATA THAT INITIATES THE DISPLAY OF THE SECOND ADVERTISEMENT FOR THE USER DEVICE ASSOCIATED WITH THE VEHICLE SERVICE INSTANCE

FIG. 5

SYSTEMS AND METHODS FOR THE DISPLAY OF CORRESPONDING CONTENT FOR USER-REQUESTED VEHICLE SERVICES USING DISTRIBUTED ELECTRONIC DEVICES

PRIORITY CLAIM

The present application is a continuation of U.S. Non-Provisional patent application Ser. No. 18/485,519 having a filing date of Oct. 12, 2023 which is a continuation of U.S. Non-Provisional patent application Ser. No. 17/702,207 having a filing date of Mar. 23, 2022. Applicant claims priority to and the benefit of such applications and incorporates such applications herein by reference in their entirety.

FIELD

The present disclosure relates generally to improving the provision and delivery of content associated with requested vehicle services and, more particularly, to the generation and time-coordinated display of corresponding content through distributed devices for users of the requested vehicle services.

BACKGROUND

Vehicle services allow a user to request a service that may be performed by a vehicle, such as ride-sharing or delivery. For instance, a user may request, through a vehicle service application, a vehicle service having a source location and a destination location. A vehicle (and its driver) can be assigned to perform the vehicle service for the user. This can include transporting the rider or a delivery item to the destination location.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system includes one or more processors and one or more non-transitory, computer-readable media storing instructions that are executable by the one or more processors to cause the computing system to perform operations. The operations include obtaining data associated with a request for a vehicle service for a user. The operations include generating data associated with a vehicle service instance based on the request for the vehicle service for the user. The data associated with the vehicle service instance includes one or more locations associated with the vehicle service. The operations include, based on the data associated with the vehicle service instance, determining a first advertisement content item for a display device positioned on an exterior of a vehicle assigned to the vehicle service instance and a second advertisement content item for a user device associated with the vehicle service instance. The operations include communicating data that initiates the display of the first advertisement content item for the display device positioned on the exterior of the vehicle assigned to the vehicle service instance. The operations include communicating data that initiates the display of the second advertisement content item for the user device associated with the vehicle service instance.

Another example aspect of the present disclosure is directed to a computer-implemented method. The method includes obtaining, by a computing system including one or more computing devices, data associated with a request for a vehicle service for a user. The method includes generating, by the computing system, data associated with a vehicle service instance based on the request for the vehicle service for the user. The data associated with the vehicle service instance includes one or more locations associated with the vehicle service. The method includes, based on the data associated with the vehicle service instance, determining, by the computing system, a first advertisement content item for a display device positioned on an exterior of a vehicle assigned to the vehicle service instance and a second advertisement content item for a user device associated with the vehicle service instance. The method includes communicating, by the computing system, data that initiates the display of the first advertisement content item for the display device positioned on the exterior of the vehicle assigned to the vehicle service instance. The method includes communicating, by the computing system, data that initiates the display of the second advertisement content item for the user device associated with the vehicle service instance.

Yet another example aspect of the present disclosure is directed to one or more non-transitory, computer-readable media storing instructions comprising operations. The operations include obtaining data associated with a request for a vehicle service for a user. The operations include generating data associated with a vehicle service instance based on the request for the vehicle service for the user. The vehicle service instance is associated with a request for a vehicle service for a user and the data associated with the vehicle service instance includes one or more locations associated with the vehicle service. The operations include, based on the data associated with the vehicle service instance, determining a first advertisement content item for a display device positioned on an exterior of a vehicle assigned to the vehicle service instance and a second advertisement content item for a user device associated with the vehicle service instance. The operations include communicating data that initiates the display of the first advertisement content item for the display device positioned on the exterior of the vehicle assigned to the vehicle service instance. The operations include communicating data that initiates the display of the second advertisement content item for the user device associated with the vehicle service instance.

Other example aspects of the present disclosure are directed to other systems, methods, vehicles, apparatuses, tangible non-transitory computer-readable media, and devices for coordinated display of related content across a distributed set of electronic devices used in associated with a vehicle service request.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5 depicts a flowchart diagram of an example method for displaying advertisements to a user of a vehicle service according to example embodiments of the present disclosure.

DETAILED DESCRIPTION

Figure 1:
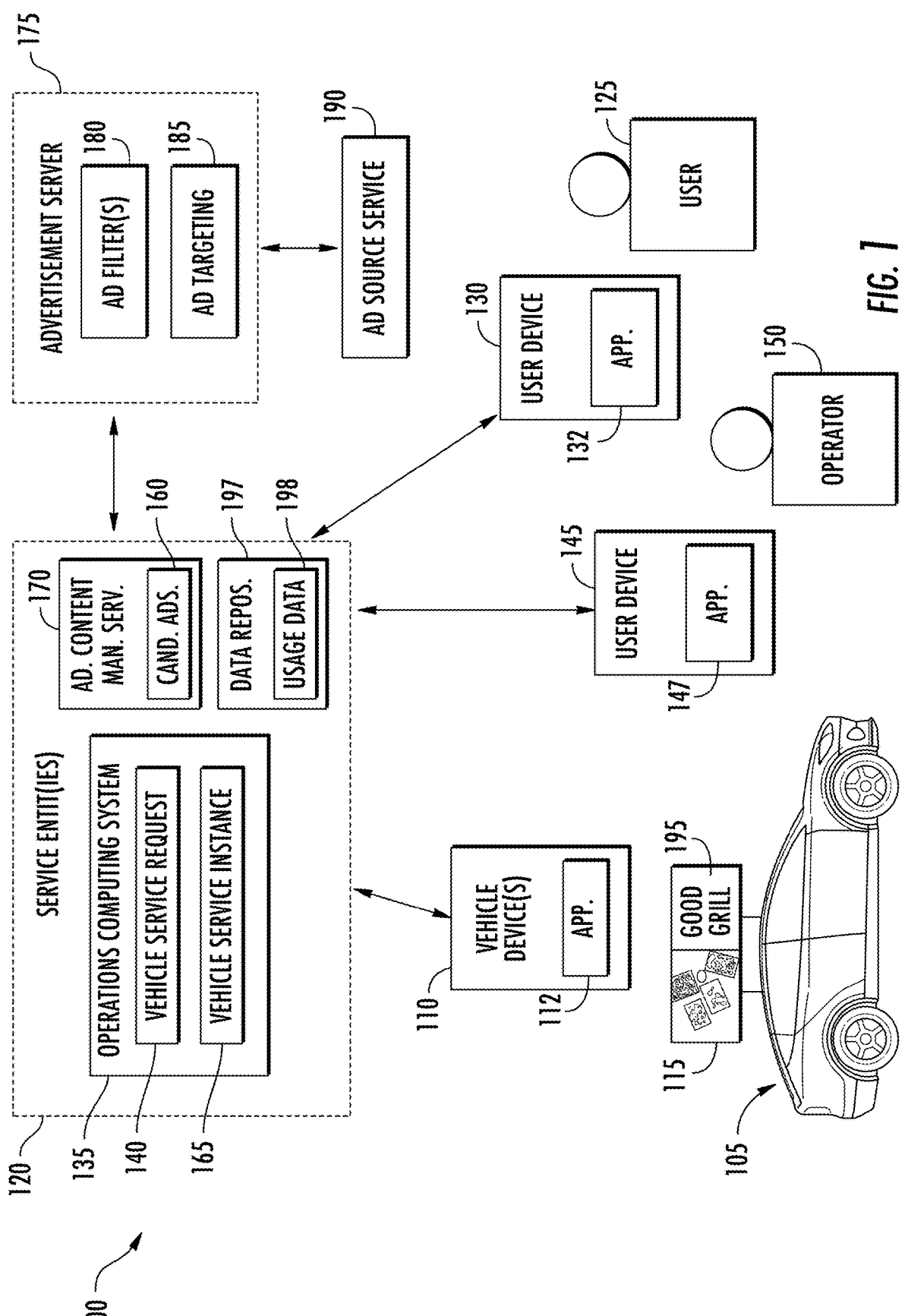
FIG. 1 depicts a block diagram of an example system for displaying advertisements to a user of a vehicle service according to example embodiments of the present disclosure.

Generally, the present disclosure is directed to improvements in presenting relevant materials to vehicle service users through a set of distributed devices. For example, a service entity (e.g., a ridesharing/hailing entity) can utilize a fleet of vehicles and operators (e.g., cars with drivers) to coordinate vehicle services (e.g., transportation, delivery, etc.) for users. The users can request a vehicle service through a software application on a user device. The service entity's operations computing system (e.g., network system/ platform) can process this request to match the user to a vehicle for the requested service. According to example aspects of the present disclosure, the operations computing can coordinate the display of certain material to the user via a display device on the vehicle (e.g., a cartop display screen) as well as corresponding material on the user device of the user (e.g., the user's mobile phone).

For example, the operations computing system can process the user's request, match it to a vehicle, and generate a vehicle service instance. The vehicle service instance can indicate one or more locations associated with the requested vehicle service. This can include, for example, a pick-up location, destination location, and/or intermediate location(s). The operations computing system can use the vehicle service instance to determine advertisements that can be displayed to the user via two different formats. For instances, the operations computing system can utilize an advertisement engine to select a first advertisement content item for display via a display device positioned on an exterior of a vehicle assigned to a vehicle service instance. The display device can include a display device (e.g., screen, monitor, etc.) located on top of the vehicle (e.g., a cartop display). The operations computing system can also select a second advertisement content item for display via a user device associated with the vehicle service instance (e.g., the user's mobile phone, a tablet onboard the vehicle, etc.).

The first advertisement content item can correspond to the second advertisement content item such that the first advertisement content item and the second advertisement content item are associated with the same or a similar advertisement subject. Advertisement subjects can include, for example: products, brands, logos, events, companies, locations, cities, travel destinations, goods, services, advertisers, others, etc. By way of example, the first advertisement content item can include a first visual advertisement for a certain drink product that is displayable on the exterior display device of the vehicle. The second advertisement content item can include a same visual advertisement for the drink product or a related advertisement such as, for example, a coupon for the drink product. In some implementations, the coupon can be redeemable through a software application of the service entity. This can be the software application used to request the vehicle service (e.g., for transportation of the user) and/or another software application (e.g., for ordering food delivery).

The advertisement content items can be determined based on the location(s) ("waypoint(s)") associated with the vehicle service instance. For instance, the advertisements may be determined based at least in part on a pick-up location or a destination location of the vehicle service instance and/or one or more intermediate locations between the pick-up location and the destination location. This can allow the advertisements to be more closely related to the relevant environment in which the user is traveling. By way of example, a user may request a transportation service from a pick-up location to a destination location. The pick-up location may be, for example, the user's workplace. Additionally and/or alternatively, the destination location may be the user's home. Based on these locations and/or other data associated with the vehicle service instance (e.g., time of day, user preferences, etc.), the operations computing system can recognize that the user is returning home after, for example, a day of work. The operations computing system may, thus, determine that the user may be interested in a delivery order for dinner, groceries, etc. Accordingly, the operations computing system can select a first advertisement content item for a restaurant or grocery store to be displayed on the exterior display device of the vehicle and a second advertisement content item for a delivery service whereby the user can order food to be delivered from the restaurant or grocery store via a user's phone. In some implementations, the user can interact with the second advertisement content item (e.g., while riding in the vehicle) to initiate a new vehicle service instance by which another vehicle delivers food to the user's home from the restaurant or grocery store.

In some implementations, the second advertisement can be or can include a promotional offer that is redeemable through a vehicle service application on the user device. For instance, in some implementations, the second advertisement can display a coupon code, promotional code, discount code, or other similar code. As another example, in some implementations, the second advertisement can be interacted with to initiate a promotional offer. For instance, in some implementations, when the user taps on or otherwise interacts with the second advertisement, the vehicle service application can apply a promotional offer (e.g., a discount, etc.) to a vehicle service.

In some implementations, the first advertisement and/or the second advertisement can be determined through communication with an advertisement engine. For instance, in some implementations, data associated with a vehicle service instance, such as locations associated with the vehicle service instance, user preferences, time of day, etc. may be communicated to the advertisement engine. The advertisement engine can be configured to determine the first advertisement and/or the second advertisement based on the data associated with the vehicle service instance. In some implementations, the advertisement engine can be associated with (e.g., executed on) a same or similar computing system, and/or a distinct computing system, from a service entity configured to implement the vehicle service. For instance, in some implementations, communication of the first advertisement and/or the second advertisement to the display device and/or user device can be performed by any suitable computing system, such as any intermediate computing systems.

In some implementations, the first advertisement and/or the second advertisement can be determined based on one or more locations associated with a vehicle service instance. As an example, in some implementations, the one or more locations can be or can include a pick-up location associated with the vehicle service instance. Additionally and/or alternatively, in some implementations, the one or more locations can be or can include a destination location associated with the vehicle service instance. For instance, the vehicle service instance may provide for movement of a vehicle between a pick-up location and a destination location. The vehicle may pick-up one or more users, one or more goods (e.g., groceries, takeout, etc.), and/or other suitable loads at the pick-up location. Additionally and/or alternatively, the vehicle may drop the load(s) off at the destination location. The one or more locations can additionally and/or alternatively be or include an intermediate location between the pick-up location and the destination location. For instance, the one or more locations can be "waypoints" that correspond to points of interest along or near the path of the vehicle service instance.

As one example, the user may have requested a vehicle service to transport the user from a workplace of the user to a home of the user. The advertisement engine can receive the destination and/or pickup location of the vehicle service instance and determine that the user is heading home from work. The advertisement engine can further determine that the user may be receptive to advertisements for delivery meals. Based on this determination, the user may thus be provided with first and second advertisements corresponding to restaurants. As another example, the user may be picked up from a grocery store. The advertisement engine may thus determine that the user would be receptive to a coupon for free delivery of groceries from that store. Additionally, in some implementations, the advertisement(s) can be determined based on locations associated with the vehicle service instance. For instance, the advertisements may be determined based on a pick-up location or a destination location of the vehicle service instance and/or one or more intermediate locations between the pick-up location and the destination location.

The operations computing system can coordinate the display of the selected advertisement content items via the various devices. For instance, the operations computing system can communicate data indicative of the first advertisement content item (e.g., the ad for the restaurant/grocery store) for the vehicle's exterior display device and data indicative of the second advertisement item (e.g., the ad for delivery of food from the restaurant/grocery store) to the user's device. In some implementations, the first and/or second advertisement content items can be displayed when the vehicle is within an ad target range. The ad target range can include, for example, a threshold distance to the pick-up location.

In some implementations, communicating the data that initiates the display of the first advertisement can include communicating the data that initiates the display of the first advertisement such that the first advertisement is displayed prior to the vehicle arriving at a pick-up location associated with the vehicle service instance. For instance, in some implementations, the first advertisement may be displayed prior to the vehicle arriving at the pick-up location such that the first advertisement is visible to the user as the vehicle arrives at the pick-up location.

Additionally and/or alternatively, in some implementations, communicating the data that initiates the display of the first advertisement can include communicating the data that initiates the display of the first advertisement such that the first advertisement is displayed prior to the user boarding the vehicle. For instance, the first advertisement may be displayed such that the user is able to view the advertisement prior to boarding the vehicle. Any suitable method may be used in accordance with example aspects of the present disclosure to determine that the user has boarded the vehicle. For example, the user, the driver, and/or the vehicle may be provided with an interface element that, when interacted with, confirms the presence of the user in the vehicle. As another example, the user may be determined to have boarded the vehicle based on one or more sensors (e.g., a weight sensor in a seat, an interior camera, etc.). As another example, in some implementations, the user may be considered to have boarded the vehicle once the vehicle resumes motion. As used herein, boarding refers to the presence of the user in the vehicle. Additionally and/or alternatively, in some implementations, the second advertisement can be displayed once the user has boarded the vehicle.

As one example, in some implementations, communicating data that initiates display of the first advertisement can include determining that the vehicle is within an ad target range of the pick-up location associated with the vehicle service instance. As an example, in some implementations, the advertisement may be displayed when the vehicle is within the ad target range as indicative that the user is likely to be able to view the advertisement when the vehicle is within the ad target range. The ad target range can be any suitable range, such as a fixed range, a range determined based on information about the vehicle service instance, etc. Based on determining that the vehicle is within the ad target range of the pick-up location, the data that initiates display of the first advertisement can be communicated. As another example, certain types of advertisements may be restricted based on types of nearby locations of the vehicle. For instance, a certain type of advertisement subject may not be displayed within a region that is associated with advertisement constraints (e.g., school zones, etc.).

The following disclosure provides an end-to-end example via one or more example implementations according to example aspects of the present disclosure.

A vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s), cargo, load, etc. to a requested destination location), courier services (e.g., by which a vehicle retrieves item(s) from a requested origin location and delivers the item to a requested destination location), and/or other types of services. Moreover, the vehicle can include a communications system that can allow the vehicle and/or the operator thereof (e.g., a user device associated with a driver) to communicate with a computing system that is remote from the vehicle such as, for example, that of a service entity.

An operations computing system of the service entity can help to coordinate the performance of vehicle services by vehicles. For instance, the operations computing system can include a service platform. The service platform can include a plurality of back-end services and front-end interfaces, which are accessible via one or more APIs. For example, another computing system or device that is remote from the vehicle (e.g., a user device associated with an operator of the vehicle) can communicate/access the service platform (and its backend services) by calling the one or more APIs. Such services can facilitate secure, bidirectional communications between those remote devices and/or the service entity's operations computing system.

The service platform can allow a vehicle and/or associated device to obtain data from and/or communicate data to the operations computing system. By way of example, a user can provide (e.g., via a user device) a request for a vehicle service to the operations computing system (and/or another system associated therewith). The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more vehicles that may be able to perform the requested vehicle services for the user. For instance, the operations computing system can identify which vehicle(s)/operators are online with the service entity (e.g., available for a vehicle service assignment, addressing a vehicle service assignment, etc.). A vehicle/operator can go online with a service entity by, for example, an operator's user device connecting with the service entity's operations computing system (e.g., the service platform) so that the device can communicate with the operations computing system via a network. Once online, the operations computing system can communicate a vehicle service assignment indicative of the requested vehicle services and/or other data to the connected device.

In some implementations the vehicle assigned to the vehicle service can be indicated by the vehicle itself. For instance, in some implementations, the vehicle can have a unique identifier (e.g., a license plate, alphanumeric serial number, etc.) that is associated with the vehicle itself. Additionally and/or alternatively, in some implementations, the vehicle assigned to the vehicle service can be indicated by a driver of the vehicle and/or a user device associated with the vehicle and/or the driver of the vehicle. For instance, in some implementations, the driver may have one or more vehicles that are associated with the driver in the vehicle service application. As one example, the vehicle service application may provide the driver with the capability to define one or more vehicles as belonging to or being operated by the driver. The driver and/or the vehicle may be assigned to a given vehicle service instance. As one example, an operations computing system of a service entity (e.g., an entity that offers and/or coordinates vehicle service(s), etc.) can identify a vehicle. The vehicle can be a manually operated by a driver, an autonomous vehicle, and/or any other suitable vehicle for providing vehicle services (e.g., transportation services, delivery services, courier services, etc.). The operations computing system can determine that the vehicle (and/or a vehicle provider or vehicle operator associated therewith) corresponds to previously stored identification data (e.g., to ensure that the vehicle, vehicle provider, and/or the operator is known to the service entity, etc.).

The operations computing system can generate a vehicle service instance based on the request for the vehicle service. The vehicle service instance can be, for example, a data structure that is indicative of the user, the vehicle, location(s) (e.g., pick-up, destination, intermediate, etc.), one or more service parameters (e.g., service type, certain preferences, etc.), entities associated with delivery items (e.g., restaurants, etc.), and/or other information associated with the vehicle service.

In some implementations, the operations computing system can obtain a service adjustment request from the user device. The service adjustment request can be indicative of a service adjustment selected by a user (e.g., using one or more user interface elements provided by a service entity application executed on the user device, etc.). Based on the service adjustment data, the operations computing system can provide service adjustment data to the user device using the backend service of the computing system. More particularly, the service adjustment data can be configured to adjust one or more aspects of the service provided by the vehicle in accordance with the service adjustments selected by the user (e.g., as indicated by the service adjustment request, etc.). The service adjustment data can include any adjustment that can be selected by a user for the service being provided (e.g., a service stop request, a destination modification request, a service support request, a service safety request, etc.). As an example, the service adjustment data may include an adjustment from a first destination to a second destination. As another example, the service adjustment data may include an adjustment that stops the vehicle along its current route. In such fashion, the vehicle service provided by the service entity and/or a vehicle provider associated with the service entity can be dynamically adjusted according to service adjustment requests of a user of the service.

In some implementations, a user device associated with a user of the vehicle service can include (e.g., execute) a vehicle service application. The vehicle service application can provide the user with the capability to request vehicle services (e.g., ride-sharing, delivery, etc.) through the vehicle service application. As one example, the vehicle service application may provide the user with the capability to select a pick-up location and/or a destination location. The vehicle service application may additionally and/or alternatively provide the user with information regarding the requested vehicle service, such as information about a driver and/or a vehicle, information about travel time(s), cost, etc.

The operations computing system can obtain data indicative of a request for a vehicle service from a user device of a user. The operations computing system can generate a vehicle service instance that includes, for example, one or more locations associated with the requested vehicle service. Based on the data associated with the vehicle service instance (e.g., the identified locations), the operations computing system can determine a first advertisement content item for a display device positioned on an exterior of a vehicle assigned to the vehicle service instance. This display device can be display screen, monitor, television, or other apparatus that includes hardware and software for rendering visual content. The display device can be positioned, for example, on the roof of the vehicle. The first advertisement content item can include, for example, an advertisement for a restaurant that the vehicle will pass while transporting the user to the destination location. In some implementations, the operations computing system (and/or an advertisement engine) can access data to determine that this can be a restaurant from which the user has previously ordered. The operations computing can determine a second advertisement content item for a user device associated with the vehicle service instance. The second advertisement content item can include, for example, an interactive coupon for a food item from the restaurant. A user can interact with the coupon to launch a food delivery software application that would allow the user to order food from the restaurant. The operations computing system can communicate data (e.g., instructions, control signals, data packages of content, etc.) that initiates the display of the first advertisement content item for the display device positioned on the exterior of the vehicle and data that initiates the display of the second advertisement content item for the user device of the user (and/or a user device within the vehicle). The user can visualize the first advertisement content item on the outside of the vehicle as the user is boarding and the second advertisement content item on the user device of the user, while the user is riding in the vehicle. The user can interact with the second advertisement content item, if desired, to order food from the restaurant. In some implementations, the vehicle can be re-routed to pick up the food or a separate vehicle instance (e.g., a delivery instance) can be created to deploy a different vehicle/operator to pick up the food for the user.

The technology described herein can provide many benefits and technical effects. For instance, the technology of the present disclosure can allow a user to be presented with advertisements at two unique times and/or in two distinct positions. This can include presentation of the advertisement material via an out-of-form platform (e.g., the cartop display) before the user boards the vehicle and via an in-form platform (e.g., an app on a user device) after the user boards the vehicle. As such, the technology can increase the likelihood of the user (of the vehicle service) interacting with the advertisements. Moreover, by determining advertisements based on related locations/waypoints, the technology of the present disclosure can improve the relevancy of the content displayed for the user. This can help to utilize the computing resources (e.g., processing, power, etc.) of the vehicle's exterior display device in a more efficient manner. Additionally, the technology of the present disclosure can help save the computing resources of the user device by reducing the amount of processing, power and memory resources that would otherwise be utilized for searching without the suggestions provided to the user by the current technology.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art. With reference to the figures, example embodiments of the present disclosure will be discussed in further detail. The technology described herein includes the collection of data and provision of certain content to users associated with a vehicle service. Users can be given the opportunity to customize data collection and provision features. Data collection and provision can be configured with options for permissions to be obtained from users such that data is collected or provided for authorized use in accordance with the disclosed techniques. For example, a user can control whether certain usage data is collected and/or whether certain content is provided to the user (e.g., through opt-out features, settings, etc.). Any personal data can be removed and data can be stored in a secured, anonymized manner. In this manner, the users can be provided control over what data is collected, used, and provided to a user for the implementations described herein.

With reference now to the figures., example aspects of the present disclosure will be discussed in further detail. FIG. 1 depicts a block diagram of an example system 100 for routing and matching vehicles to vehicle service requests and displaying advertisements according to example embodiments of the present disclosure. As illustrated, FIG. 1 shows a system 100 that can include a vehicle 105 and one or more vehicle devices 110 that can be associated with the vehicle 105 (e.g., an onboard tablet, etc.). The vehicle device(s) 110 can include a software application 112 associated with the service entity, which can run on the vehicle device(s) 110. The vehicle 105 can include an exterior display device 115 positioned on the exterior of the vehicle 105. The system 100 can include one or more service entities 120 that can facilitate a request for services from a user 125. For example, the user 125 can submit a request through a user device 130 associated with the user (e.g., via a software application 132, etc.). An operations computing system 135 associated with the service entity 120 can receive a vehicle service request 140 from the user device 130. The operations computing system 135 can send a request to a user device 145 associated with an operator 150 (e.g., via a software application 147, etc.) for the operator 150 to perform the requested vehicle service. The operator 150 can be associated with the vehicle 105 (e.g., a driver of the vehicle, etc.).

The operations computing system 135 can include, communicate with, utilize, and/or otherwise be associated with an advertisement content management service 170. The advertisement content management service 170 can communicate with an advertisement server 175. The advertisement server 175 can communicate data indicative of ad filters 180 and ad targeting 185 to an ad source service 190. The ad source service 190 can provide advertisement content items 195 to the advertisement server 175. The advertisement server 175 can communicate the advertisement content item 195 to the advertisement content management service 170. The advertisement content management service 170 (and/or the operations computing system 135, etc.) can communicate data that initiates display of the advertisement content item 195 on the exterior display device 115 of the vehicle 105, as further described herein.

The vehicle device(s) 110, the exterior display device 115, the user device 130 of the user 125, and/or the user device 145 of the operator 150 can each include a respective positioning system and a communications system (not shown). A positioning system can determine a current position (e.g., location, etc.) of the respective device. The positioning system can be any device or circuitry for analyzing the position of the device. For example, the positioning system can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the device can be used by the various other systems of system 100. For example, data indicative of a device's position (e.g., location, etc.) can be stored, communicated to, and/or otherwise obtained by the operations computing system 135, the advertisement server 175, etc.

A communications system can be used for communication between/among devices and systems. For instance, the communications system of the user device 145 of the operator 150 can be configured to allow the user device 145 to communicate with other computing systems (e.g., operations computing system 135, etc.) and devices (e.g., user device 130 associated with the user 125, a user device of an entity where an item is to be retrieved, etc.). The communications system of the user device 130 of the user 125 can be configured to allow the user device 130 to communicate with other computing systems (e.g., operations computing system 135, etc.) and devices (e.g., user device 145 associated with the operator 150). The communications system of the vehicle device(s) 110 of the vehicle 105 can be configured to allow the vehicle device(s) 110 to communicate with other computing systems (e.g., operations computing system 135, etc.) and devices (e.g., user device 130 associated with the user 125, user device 145 associated with the operator 150, a user device of an entity where an item is to be retrieved, etc.). The communications system of the exterior display device 115 of the vehicle 105 can be configured to allow the exterior display device(s) 115 to communicate with other computing systems (e.g., operations computing system 135, advertisement server 175, etc.) and devices (e.g., user device 145 associated with the operator 150, etc.). Communication can occur over one or more networks (e.g., via one or more wireless signal connections, etc.). The network(s) can exchange (e.g., send or receive, etc.) signals (e.g., electronic signals, etc.), data (e.g., data from a computing device/system, etc.), and/or other information and include any combination of various wired (e.g., twisted pair cable, etc.) and/or wireless communication mechanisms (e.g., cellular, wireless, satellite, microwave, and radio frequency, etc.) and/or any desired network topology (or topologies). The operations computing system 135 can receive data from the positioning system(s) and the communications system(s) to facilitate matching a user 125, vehicle service request 140, and vehicle 105 to create a vehicle service instance 165, as further described here.

The vehicle 105 can be configured to perform vehicle services for one or a plurality of different service entities 120. A vehicle 105 can perform a vehicle service by, for example and as further described herein, travelling to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 120 can be associated with the provision, coordination, management, etc. of one or more vehicle services. For example, a service entity 120 can be an individual, a group of individuals, a company (e.g., a business entity, organization, etc.), a group of entities (e.g., affiliated companies, etc.), and/or another type of entity that offers and/or coordinates the provision of one or more vehicle services to one or more users. For example, a service entity can offer vehicle service(s) to users via one or more software applications (e.g., that are downloaded onto a user computing device, etc.), via a website, and/or via other types of interfaces that allow a user to request a vehicle service. As described herein, the vehicle services can include transportation services (e.g., by which a vehicle transports user(s) from one location to another, etc.), delivery services (e.g., by which a vehicle transports/delivers item(s), cargo, loads, etc. to a requested destination location, etc.), courier services (e.g., by which a vehicle retrieves item(s) from a requested origin location and transports/delivers the item to a requested destination location, etc.), and/or other types of services. The vehicle services can be wholly performed by the vehicle 105 (e.g., travelling from the user/item pick-up location to a destination location, etc.) or performed by one or more vehicles and/or modes of transportation (e.g., transferring the user/item at intermediate transfer points, etc.).

An operations computing system 135 of the service entity 120 can help to coordinate the performance of vehicle services by vehicles. The operations computing system 135 can include and/or implement one or more service platforms of the service entity 120. The operations computing system 135 can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 135 (e.g., its one or more processors, etc.) to perform operations and functions, such as those described herein for matching users and vehicles/vehicle fleets, deploying vehicles, facilitating the display of advertisement content items on display devices associated with vehicles, facilitating the provision of vehicle services via vehicles, etc.

A user 125 can request a vehicle service from a service entity 120. For example, the user 125 can provide user input to a user device 130 to request a vehicle service (e.g., via a user interface associated with a mobile software application 132 of the service entity 120 running on the user device 130, etc.). The user device 130 can communicate data indicative of a request for a vehicle service (a "vehicle service request" 140) to the operations computing system 135 associated with the service entity 120 (and/or another associated computing system that can then communicate data to the operations computing system 130). The vehicle service request 140 can be associated with the user 125. The associated user 125 can be the one that submits the vehicle service request (e.g., via the software application 132 on the user device 130). In some implementations, the user may not be the user 125 that submits the vehicle service request 140.

The vehicle service request 140 can include data indicative of the user 125. For example, the vehicle service request can include an identifier associated with the user 125 and/or the user's profile/account with the service entity 120. The vehicle service request 140 can be generated in a manner that avoids the use of personally identifiable information and/or allows the user 125 to control the types of information included in the vehicle service request 140. The vehicle service request 140 can also be generated, communicated, stored, etc. in a secure manner to protect information.

The vehicle service request 140 can indicate various types of information. For example, the vehicle service request 140 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, to avoid a certain area, etc.). The vehicle service request 140 can indicate a type, size, and/or class of vehicle such as, for example, a sedan, an SUV, luxury vehicle, standard vehicle, truck, etc. The vehicle service request 140 can indicate a product of the service entity 120. For example, the vehicle service request 140 can indicate that the user 125 is requesting a transportation pool product by which the user 125 would potentially share the vehicle 105 (and costs) with other users/items. In some implementations, the vehicle service request 140 can explicitly request for the vehicle service to be provided by an autonomous vehicle or a human-driven vehicle. In some implementations, the vehicle service request 140 can indicate a number of users that will be riding in the vehicle and/or utilizing the vehicle service. In some implementations, the vehicle service request 140 can indicate preferences and/or special accommodations of an associated user (e.g., music preferences, climate preferences, wheelchair accessibility, etc.) and/or other information.

The operations computing system 135 of the service entity 120 can process the data indicative of the vehicle service request 140 and generate a vehicle service assignment that is associated with the vehicle service request. The vehicle service assignment can include, for example, a request for an operator 150 and/or vehicle 105 to perform the requested vehicle service. The operations computing system can identify one or more vehicles (e.g., candidate vehicles) that may be able to perform the requested vehicle service for the user 125. The operations computing system 135 can identify which modes of transportation are available to a user 125 for the requested vehicle service (e.g., human-driven vehicles, autonomous vehicles, etc.) and/or the number of transportation modes and/or legs of a potential itinerary of the user for completing the vehicle service (e.g., single or plurality of modes, single or plurality of legs, etc.). For example, the operations computing system 135 can determined which vehicle(s) are online with the service entity 120 (e.g., available for a vehicle service assignment, already addressing a vehicle service assignment, etc.) to help identify which vehicle(s) would be able to provide the vehicle service.

The operations computing system can communicate data indicative of the vehicle service assignment to an operator 150 and/or a vehicle 105. For instance, the operations computing system 135 can send a request to the user device 145 of the operator 150. The request (for the operator 150 to accept the vehicle service assignment) can be communicated to the operator 150 via the software application 147 running on the user device 145 associated with the operator 150. Additionally, or alternatively, the operations computing system 135 can send a request to the vehicle device(s) 110 of the vehicle 105 (e.g., a tablet stored onboard the vehicle). The request (for the operator 150 to accept the vehicle service assignment) can be communicated to the operator 150 via the software application 112 running on a vehicle device 110. The operator 150 can provide user input to the user device 145 (e.g., via the software application 147) and/or the vehicle device(s) 110 (e.g., via the software application 112) to accept or decline the vehicle service assignment. Data indicative of the acceptance or rejection of the request can be provided to the operations computing system 135.

The operations computing system 135 of the service entity 120 can process the data indicative of the vehicle service assignment to generate a vehicle service instance 165. The vehicle service instance 165 can include a data structure. The vehicle service instance 165 can include data associated with a user (e.g., a user identifier, etc.), a vehicle service request (e.g., a pick-up location, a destination location, etc.), and a vehicle (e.g., the selected vehicle to provide the vehicle service, etc.).

The operations computing system 135 can maintain, store, etc. data associated with vehicle services over time in a data repository 197. This can include, for example, data associated with the user 125. As described herein, the user can be presented with options for controlling the types, frequency, etc. of data collected. The data associated with the user can include historical vehicle service usage data 198 of the user and/or one or more other users. The historical vehicle service usage data 198 can include, for example, data indicative of the past locations associated with past vehicle service request(s)/instance(s) of the user and/or other users (e.g., past pick-up locations, past drop-off locations, past entities from which the user has ordered items, etc.). In some implementations, the historical vehicle service usage data can include preferences and/or characteristics associated with past vehicle service request(s)/instance(s). This can include, for example, types of items (e.g., food, etc.) ordered for delivery, types of locations visited (e.g., restaurant, entertainment, work, home, etc.), and/or other information. In some implementations, the historical vehicle service usage data can include data indicative of timing associated with past vehicle services (e.g., when food delivery was requested, etc.). As described herein, the historical vehicle service usage data 198 can be used to determine advertisement content items for a user 125.

The vehicle 105 can include an exterior display device 115. The exterior display device 115 can receive data from one or more other systems/devices of system 100. For example, the exterior display device 115 can obtain data from the operations computing system 135, the advertisement server 175, and/or another device (e.g., the vehicle device(s) 110, user devices 130/145, etc.). The data received can initiate display of a content item (e.g., advertisement content item 195, etc.) on the external display device 115. For example, the external display device 115 can be any type of display device (e.g., a cartop advertisement display device, liquid crystal display (LCD), liquid emitting diode display (LED), organic light emitting diode (OLED), plasma monitor, cathode ray tube (CRT), or any other display device located on any external surface of a vehicle, etc.). The exterior display device 115 can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 135 (e.g., its one or more processors, etc.) to perform operations and functions, such as those described herein for presenting/rendering content via a physical display. By way of example, the exterior display device 115 can obtain data indicative of an advertisement content item 195 and process the data to present a visualize of the advertisement content item 195 via/through a screen of the exterior display device 115.

In some implementations, an advertisement content item 195 can be selected, for example, using an advertisement content management service 170 and/or an advertisement server 175. The operations computing system 135 can include, communicate with, etc. the advertisement content management service 170. The advertisement content management service 170 can help with the selection of, provision of, and/or coordinating display of candidate advertisement content item(s) 160 for the service entity 120 (e.g., for vehicle services), as further described herein. For example, the advertisement management service 170 can coordinate with the advertisement server 175 and/or the exterior display device 115 to facilitate the display of an advertisement content item 195. In some implementations, the advertisement content management service 170 can include an advertisement server such as the advertisement server 175. The advertisement server 175 (and/or its source service) can be associated with the service entity providing the vehicle service and included in its computing systems. The advertisement server 175 (and/or its source service) can be associated with a third-party that is not associated with the service entity providing the vehicle service.

The advertisement content management service 170 can communicate with an advertisement server 175 via one or more networks. The advertisement server 175 can control generation and/or provision of advertisements to the advertisement content management service 170 and, ultimately, to the exterior display device 115, user device 130, and/or other endpoint(s). For instance, the advertisement content management service 170 can communicate a request for an advertisement content item to the advertisement server 175. Candidate advertisement content item(s) 160 may be filtered by using advertisement filter(s) 180 (e.g., of an advertisement filtering service, etc.). Additionally and/or alternatively, the candidate advertisement content item(s) 160 may be targeted using advertisement targeting 185 (e.g., of an advertisement targeting service, etc.).

For example, the advertisement server 175 can include data indicative of one or more advertisement filters 180 and advertisement targeting 185. The data indicative of the one or more advertisement filters 180 can be associated an advertisement filtering service. The advertisement server 175 (e.g., via the advertisement filtering service) can filter candidate advertisement content items 160 based on an advertisement type. For instance, the advertisement filtering service can accept an advertisement type or advertisement category and a location (e.g., coordinates) and determine whether the advertisement type or advertisement category should be displayed at the location (e.g., as a Boolean value). The data indicative of the advertisement targeting 185 can be associated with an advertisement targeting service. The advertisement targeting service can restrict irrelevant candidate advertisement content items 160 from being provided to the advertisement management service 170. As one example, advertisers may be provided with the capability of targeting their advertisements based on one or more points of interest. The advertisement targeting service can represent the points of interest as a geofence, ad target area, etc. The advertisement targeting service (e.g., using the advertisement targeting 185, etc.) can decide whether to show a specific advertisement based on the geofence.

The advertisement server 175 can also communicate with an advertisement source service 190. The advertisement source service 190 can be a repository of advertisement content items, such as a central advertisement database. As one example, advertisers may define, create, upload, or otherwise provide advertisement content items to advertisement source service 190. For instance, an advertisement content item may have an associated campaign identifier, advertiser identifier, time, location, individual identifier, etc. The campaign identifier may uniquely identify an advertisement campaign (e.g., a campaign for a particular promotion, event, time period, etc.). The advertisement content item may also have associated spatial and/or temporal endpoints. For instance, the advertisement content item and/or associated metadata may define coordinates or other geographic markers for the start and/or end of advertisement display, time stamps, etc.

The advertisement server 175 can retrieve one or more advertisements from the advertisement source service 190 in response to a request for an advertisement content item. For instance, the advertisement server 175 can submit a request to the advertisement source service 190 for an advertisement content item. The request can include information associated with the advertisement filters 180 and the advertisement targeting 185. In response to obtaining data from the advertisement server 175, the ad source service 190 can provide data indicative of candidate advertisement content items 160 and/or a selected advertisement content item (e.g., advertisement content item 195, etc.). The data indicative of the candidate advertisement content items 160 (and/or selected advertisement content item) can be communicated to the advertisement content management service 170. Data indicative of an advertisement content item can be communicated from any one or more of the advertisement content management service 170, the operations computing system 135, the advertisement server 175, the advertisement source service 190, and/or other system. For example, such data can be communicated to the exterior display device 115 directly by one of these system(s) or indirectly by one of these systems(s) (e.g., through an intermediary system, etc.). Communicating the data indicative of the advertisement content item (e.g., advertisement content item 195, etc.) can initiate display of the advertisement content item 195 on the exterior display device 115 associated with the vehicle 105, as described herein.

The operations computing system 135 (e.g., in communication with the advertisement service 170) can determine corresponding advertisement content to be displayed for a user 125 associated with a vehicle service instance 165. This can include, for example, the display of advertisement content across a variety of distributed devices including the user device 130, operator device 145, vehicle user device(s) 110, etc.

Figure 2:
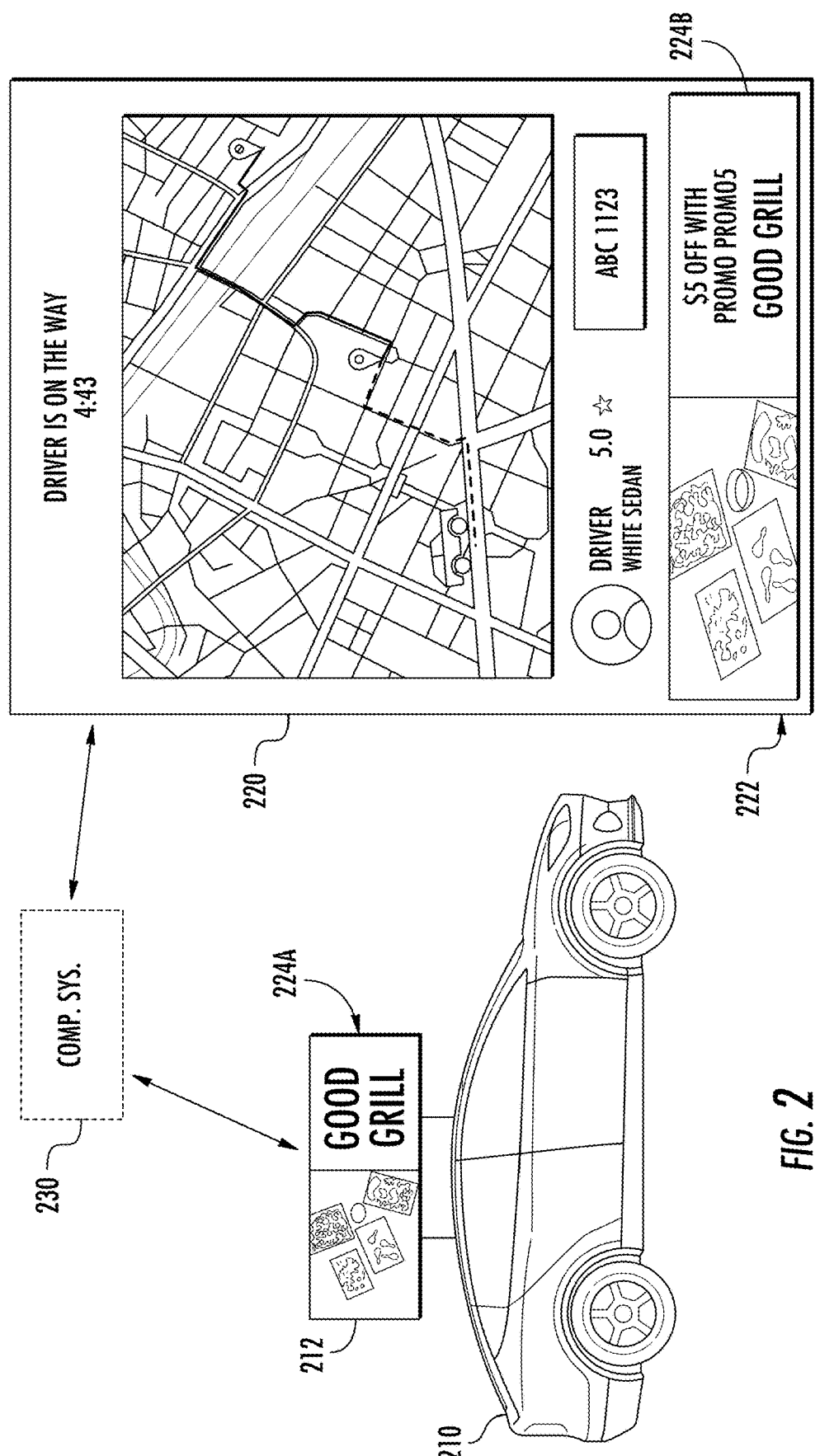
FIG. 2 depicts example corresponding advertisements according to example embodiments of the present disclosure.

FIG. 2 depicts example corresponding advertisements according to example embodiments of the present disclosure. As illustrated in FIG. 2, a vehicle 210 can be fitted with an exterior display 212 (e.g., a cartop display). The exterior display 212 can be in communication with a computing system 230 (e.g., an operations computing system) of a service entity configured to provide vehicle services. The computing system 230 can additionally be in communication with a user device 220. User device 220 can execute one or more applications running on the user device 220. In some implementations, the application(s) can include one or more vehicle service applications through which a user of user device 220 can request and/or control vehicle services. This can include a vehicle service application for requesting transportation of the user and/or a vehicle service application for requesting delivery or courier of an item, cargo, etc. In some implementations, the user device 220 can be a user device of an operator of the vehicle 210 and/or a vehicle user device associated with and onboard the vehicle 210 (e.g., a tablet for a user riding in the vehicle 210). As illustrated in FIG. 2, the application running on the user device 210 can include user interface elements such as an estimated time of arrival, local map of the service locations, information about an operator, information about the vehicle 210, etc. The application can additionally include an advertisement space 222 configured to display advertisements to the user while the application is open.

The computing system 230 can provide corresponding advertisements to the exterior display 212 and the advertisement space 222 according to example aspects of the present disclosure. For instance, the computing system 230 can determining a first advertisement content item 224A for the display device 212 positioned on an exterior of the vehicle 210 assigned to the vehicle service instance and a second advertisement content item 224B for a user device 220 associated with the vehicle service instance (e.g., a mobile of the user, a tablet onboard the vehicle). The computing system 230 can determine advertisement content items via communication with another computing system such as, for example, advertisement server 175. By way of example, the data indicative of the vehicle service instance can include one or more locations (e.g., a pick-up location, drop-off location).

In some implementations, the computing system 230 can utilize this information to predict a user's intention (e.g., to go home from work at the end of the day). The computing system 230 can determine a selected advertisement content item for the exterior display device of the vehicle or the user device of the user. For example, the computing system 230 can include rules, models, tables, etc. that are configured to predict a user's intention based on location data, time, and/or other factors. The location data can include, for example, data indicative of a pick-up location and a destination location. The time can include, for example, the time-of-day. The computing system 230 can access a data structure (e.g., a user's profile) that stores historic information about locations associated with the user. For example, a user can indicate (e.g., through user input), or the computing system 230 can learn over time, that a certain location is associated with the user's work (e.g., marked as such by the user, due to the frequency of the user commuting there). Additionally, or alternatively, the user can user can indicate, or the computing system 230 can learn over time, that a certain location is associated with the user's home (e.g., given the number of trips that drop-off the user there). The rules (e.g., based on heuristics) or models (e.g. machine-learned models trained with supervised training techniques using labelled data indicative of locations, times, intentions, etc.) can be configured to receive location data and time data as an input and output a predicted user intention. By way of example, the user may request to travel from a pick-up location to a destination location at 5:00 pm. Based on this information, the rules/models can predict that the user is traveling home after work. The computing system 230 (and/or advertisement server) can determine that certain advertisement content item(s) would be valuable for the user based on the user's intention. For example, the computing system 230 (and/or advertisement server) can determine that since the user is travelling home from work at the end of the day and the time indicates that a typical dinner time is approaching, advertisement content item(s) for a restaurant and a delivery service/coupon for that restaurant would be valuable for the user. Accordingly, such advertisement content item(s) can be selected based on the user's intention and communicated to the display device of the vehicle and the user device of the user.

Additionally, or alternatively, the computing system 230 can obtain other data associated with the user. The data associated with the user can include historical vehicle service usage data of the user, as described herein. Additionally, or alternatively, the historical vehicle service usage data can be indicative of vehicle service usage of one or more other users. This data can be used for determining advertisement content item(s). In some implementations, the data associated with the user can be indicative of the type/level of vehicle service requested or previously requested. For example, the data associated with the user can indicate whether the user is requesting (or has previously requested) a user transportation service or a delivery service. Additionally, or alternatively, the data associated with the user can indicate whether the user is requesting (or has previously requested) a standard vehicle to provide a vehicle service, a luxury vehicle to provide the vehicle service, a large or small vehicle to provide the vehicle service, etc. Such data can be potentially indicative of the types of goods/services that may be of interest to the user.

Additionally, or alternatively, the computing system 230 can obtain data associated with one or more other users and/or an area in which the vehicle may travel. For example, the data associated with one or more other users can include historical demand data (e.g., associated with a food delivery service, ride service, etc.) associated with other user(s). The historical demand data can be indicative of products, services, events, locations, or the like that have historically been popular. This can include, for instance, food/drink items, restaurants, concerts, etc. that have been purchased or attended. Such data can be obtained via an advertisement server.

In some implementations, the computing system 230 can obtain data indicative of previously successful advertisement content. For instance, the computing system 230 (e.g., via an advertisement content management service) can obtain data indicative of previous advertisement content item(s) and whether such item(s) are associated with a successful conversion. A successful conversion can be determined based on, for example, a user of a vehicle service making a purchase after viewing the advertisement content item. This type of information can be identified via a service application of the service entity (e.g., a user purchases an advertised food item through a food delivery service application after display of the corresponding advertisement content).

In some implementations, the computing system 230 can generate a request for advertisement content item(s) based on the data associated with the user, data associated with one or more other users, data associated with an area in which the vehicle may travel, data associated with previously successful advertisement content, and/or other data. For example, the computing system 230 can analyze the location(s) associated with the vehicle service instance to determine that the user is traveling from work to home at the end of the day and may be interested in ordering dinner. The computing system 230 can analyze the historical vehicle service usage data of the user to determine that the user has previous ordered dinner from a particular restaurant. The computing system 230 can generate and provide a request for advertisement content item(s) for the restaurant, and delivery thereof, from another computing system associated with advertisement content (e.g., an advertisement server).

In some implementations, the computing system 230 can utilize data from other users to help determine advertisement content item(s) for a current user. For example, the computing system 230 can predict that a user may prefer delivery from a certain entity based on similar characteristics of other users (e.g., food preferences, location, order times, etc.).

In some implementations, the computing system 230 can provide data associated with the user and/or the one or more other users to another computing system associated with advertisement content (e.g., an advertisement server). The other computing system can analyze the data to determine advertisement content item(s), in a similar manner as described above with respect to computing system 230. Data indicative of advertisement content item(s) can be communicated to other systems from the computing system 230, another computing system (e.g., an advertisement server) in a direct or indirect (via an intermediate system) manner.

Coordinated advertisement content items can be provided to a distributed set of electronic devises (e.g., associated with the vehicle service). For instance, a first advertisement content item 224A can be communicated to exterior display 212 and a second advertisement content item 224B can be communicated to the user device 220 (e.g., for display in the advertisement space 222). The first advertisement content item 224A can correspond to the second advertisement content item 224B such that the first advertisement content item 224A and the second advertisement content item 224B are associated with the same or a similar advertisement subject. Advertisement subjects can include, for example: products, brands, logos, events, companies, locations, cities, travel destinations, goods, services, advertisers, others, etc. By way of example, the first advertisement content item 224A can include a first visual advertisement for a certain drink product that is displayable on the exterior display 212 of the vehicle 210. The second advertisement content item 224B can include a same visual advertisement for the drink product or a related advertisement such as, for example, a coupon for the drink product. In some implementations, the coupon can be redeemable through a software application of the service entity. The user device 220 can be configured to display the second advertisement content item 224B such that the user can interact with the second advertisement content item 224B. For example, the second advertisement content item 22B can include interactive elements (e.g., soft buttons, hyperlinks, etc.) that can be rendered via the software application used to request the vehicle service (e.g., for transportation of the user).

In some implementations, the computing system 230 (e.g., an operations computing system) can obtain data indicative of a new vehicle service instance that is based on an interaction of the user with the second advertisement content item 224B. For example, interaction with the second advertisement content item 224B (e.g., an interactive element thereof) can cause the launch of another software application (e.g., for ordering food delivery) on the user device 220 The other software application can suggest a new vehicle service for the user such as, for example, a delivery service while the user is already riding (and/or matched with) vehicle 210 for a user transportation service. In some implementations, the software application used to request the vehicle service can provide a user interface prompting the user for a new vehicle service associated with the second advertisement content item 224B.

Figure 3:
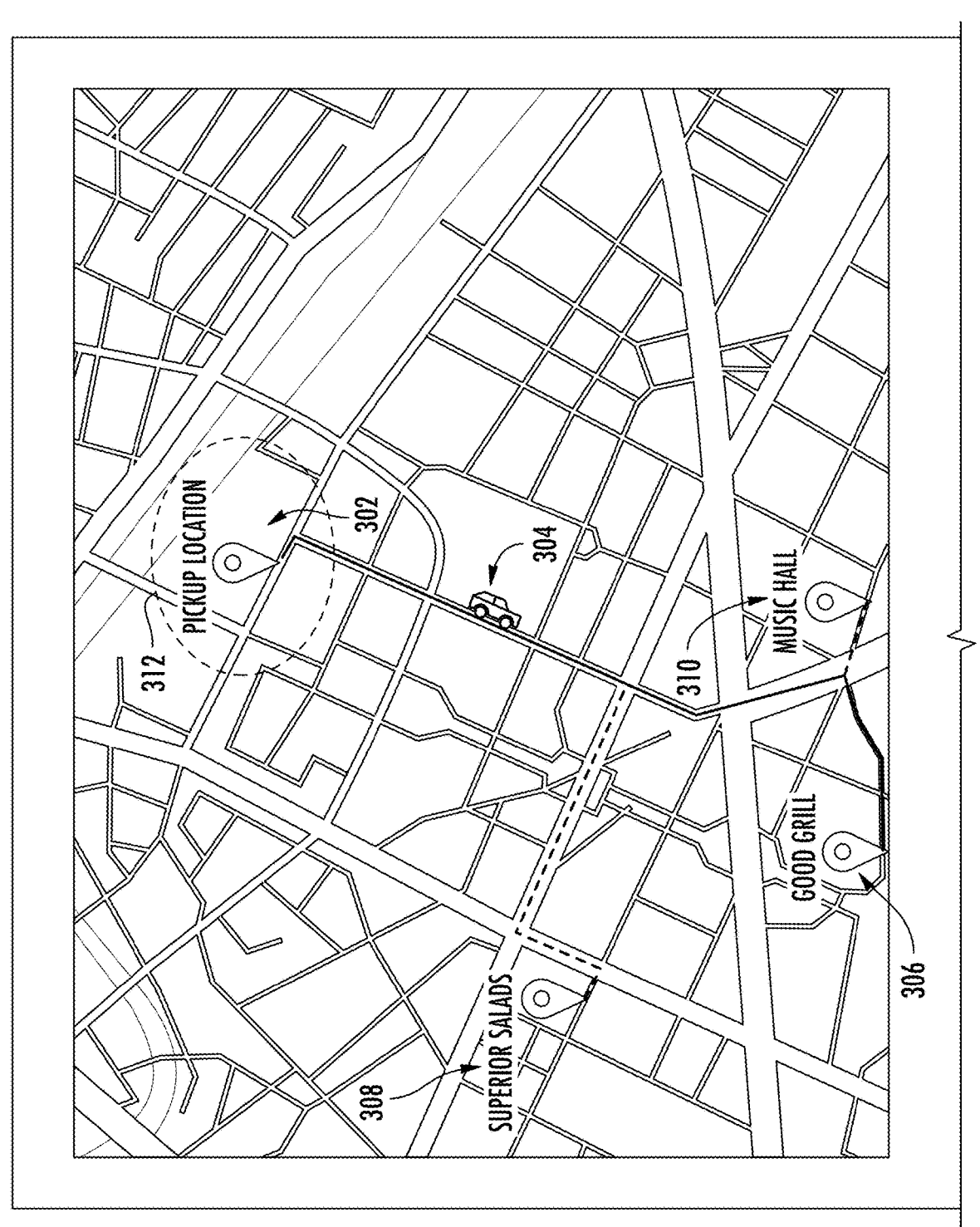
FIG. 3 depicts an example interface displaying a new suggested vehicle service having an altered destination according to example embodiments of the present disclosure.

FIG. 3 depicts an example interface 300 displaying a new suggested vehicle service instance having an altered destination according to example embodiments of the present disclosure. As one example, the interface 300 may be displayed on user device 220 of FIG. 2 and/or other suitable software applications (e.g., vehicle service applications) according to example embodiments of the present disclosure. In the example of FIG. 3, a user is traveling from a pickup location 302 to a destination location 306. The location of a vehicle assigned to the vehicle service instance is indicated by vehicle marker 304. According to example aspects of the present disclosure, a computing system 230 (e.g., via communication with an advertisement engine) may determine, such as from data indicating that the user is heading to Good Grill, that the user may be interested in advertisements for other restaurants or venues in the area (e.g., Superior Salads, Music Hall). The computing system 230 (e.g., via communication with an advertisement engine) can determine a first advertisement content item, advertising a suggested location 308, 310, for the display device positioned on an exterior of a vehicle assigned to the vehicle service instance (e.g., transporting the rider). The computing system 230 (e.g., via communication with an advertisement engine) can determine a second advertisement content item, advertising a service for transporting the user to a suggested location 308, 310, for a user device associated with the vehicle service instance. The user device associated with the vehicle service instance can include the user device of the user, the user device of the operator, and/or a user device (e.g., tablet) of the vehicle (e.g., an onboard tablet that remains in the vehicle). Data indicative of the second advertisement content item can be communicated to the user device such that the second advertisement content item is presented to the user while the user is riding in the vehicle (e.g., via interface 300).

The interface 300 may, without yet altering the user's course of navigation, provide advertisements for the suggested locations 308, 310 that the advertisement engine has recommended. For instance, the interface 300 may allow a user to tap or otherwise select one or more of the suggested locations 308, 310 to add or alter the destination location of the user's vehicle service instance. In some implementations, the user may be provided with a promotional offer related to the suggested locations 308, 310.

In some implementations, the interface 300 may allow a user to tap or otherwise select one or more of the suggested locations 308, 310 to request a new vehicle service. This can include, for example, scheduling transportation from the destination location 306 to a suggested location 310 at a later time (e.g., to attend a music event after dinner). In some implementations, this can be determined based on the user's historical data indicating one or more past locations associated with the user (e.g., concert venues, restaurants) and/or past entities the user may have requested delivery from (e.g., a food delivery service from restaurants of a similar to suggest location 308). The suggest locations can be based on a similarity in type, offering (e.g., food, music, etc.), location, etc. to one or more past locations associated with the user (e.g., locations to which the user has be picked-up, drop-off, ordered from, etc.). Such past location data can be obtained via the software application(s) of an associated service entity.

In some implementations, the computing system 230 can obtain data indicative of an ad target range 312. The ad target range 312 can be any suitable range, such as a fixed range, a range determined based on information about the vehicle service instance, etc. The ad target range 312 can be defined in terms of distance (e.g., radial distance), area (e.g., including a location associated with the vehicle service request/ instance), time (e.g., until arrival at a certain location), etc. This can represent a time and/or distance in which the user may be able to view the advertisement content on the display device of the vehicle. For example, the computing system 230 can determine that the vehicle is within (or approaching) an ad target range of the pick-up location associated with the vehicle service instance based on location data associated with the vehicle (e.g., GPS data from the operator's user device). The computing system 230 can communicate data that initiates display of the first advertisement content item (e.g., advertising the suggested location(s)) can include based on the determination that the vehicle is within (or approaching) an ad target range. The first advertisement content item may be displayed when the vehicle is within the ad target range as indicative that the user is likely to be able to view the advertisement when the vehicle is within the ad target range.

The ad target range is shown in FIG. 3 for example and illustrative purposes only. The interface 300 may not display the ad target range 312 to the user.

Figure 4:
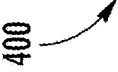
FIG. 4 depicts an example interface displaying a new suggested delivery vehicle service according to example embodiments of the present disclosure.

FIG. 4 depicts an example interface 400 displaying a new suggested delivery vehicle service instance according to example embodiments of the present disclosure. As one example, the interface 400 may be displayed on user device 220 of FIG. 2 and/or any other suitable software applications (e.g., vehicle service applications) according to example embodiments of the present disclosure. In the example of FIG. 4, a user is traveling from a pick-up location 402 at the user's work to a destination location 406 at the user's home. The location of a vehicle assigned to the vehicle service instance (e.g., to transport the user) is indicated by vehicle marker 404. According to example aspects of the present disclosure, an advertisement engine may determine, such as from data indicating that the user is heading home from work, time of day, etc., that the user may be interested in having a meal delivered. The computing system 230 (e.g., via communication with an advertisement engine) can determine a first advertisement content item, advertising a restaurant 408, for the display device positioned on an exterior of a vehicle assigned to the vehicle service instance (e.g., transporting the rider). The computing system 230 (e.g., via communication with an advertisement engine) can determine a second advertisement content item, advertising a delivery service for delivering food from restaurant 408, for a user device associated with the vehicle service instance. The user device associated with the vehicle service instance can include the user device of the user, the user device of the operator, and/or a user device (e.g., tablet) of the vehicle (e.g., an onboard tablet that remains in the vehicle). Data indicative of the second advertisement content item can be communicated to the user device such that the second advertisement content item is presented to the user while the user is riding in the vehicle (e.g., via interface 400). The user may be provided with the capability of confirming food delivery from the restaurant 408 (e.g., while being transported in accordance with a current vehicle service request/ instance). As another example, the user may be provided with a promotional offer from the restaurant 408 that the user can apply to the delivery vehicle service.

FIG. 5 depicts a flowchart diagram of an example method for determining and electronically displaying advertisement content to a user of a vehicle service through a set of distributed electronic devices according to example embodiments of the present disclosure. One or more portion(s) of the method 500 can be implemented by one or more computing devices such as, for example, the computing devices/ systems described in FIGS. 1, 2, 6, and/or 7. Moreover, one or more portion(s) of the method 500 can be implemented as an algorithm on the hardware components of the device(s) described herein (e.g., as in FIGS. 1, 2, 6, and/or 7). For example, a computing system can include one or more processors and one or more non-transitory, computer-readable media storing instructions that are executable by the one or more processors to cause the computing system to perform operations, the operations including one or more of the operations/portions of method 500. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include obtaining data associated with a request for a vehicle service for a user. The vehicle service can include, for example, a user transportation service (e.g., for a human, animal), a delivery service, a courier service, etc. The request can be submitted via a user device of the user.

At (504), the method 500 can include generating data associated with a vehicle service instance. For instance, a computing system can generate data associated with a vehicle service instance based on the request for the vehicle service for the user. The vehicle service instance can be associated with a request for a vehicle service for a user. The data associated with the vehicle service instance can include one or more locations associated with the vehicle service. The one or more locations can include at least one of: (i) a pick-up location associated with the vehicle service, (ii) a destination location associated with the vehicle service, or (iii) an intermediate location between the pick-up location and the destination location.

By way of example, a user can submit a request for a vehicle service, such as via a vehicle service application, to a service entity. A computing system (e.g., an operations computing system of the service entity) can obtain data indicative of a request for a vehicle service. As described herein, the computing system can select a vehicle (with an exterior display device) for the requested vehicle service. The computing system can generate a vehicle service instance that is indicative of the user, the vehicle, location(s), etc., as described herein. The data associated with the vehicle service instance can include any suitable data relating to the vehicle service instance. For example, the data associated with the vehicle service instance can include one or more locations associated with the vehicle service. As examples, the data can include a service instance identifier, contextual data about the vehicle service instance such as time of day, region, etc., characteristics of the vehicle service instance such as type of vehicle service, user-selectable options relating to the vehicle service instance, etc., locations associated with the vehicle service instance including pickup location, destination location, etc., data associated with the user (e.g., user preferences, user identifier, etc.), and/or any other suitable data. The data can be obtained by the computing system at least in part from a user device associated with the user.

In some implementations, at (506), the method can include obtaining data associated with a user. For instance, a computing system (e.g., operations computing system) can obtain data associated with a user. This can be the user that requested the vehicle service. The data associated with the user can include historical vehicle service usage data of the user. The historical vehicle service usage data can include, for example, data indicative of the past locations associated with past vehicle service request(s)/instance(s) of the user (e.g., past pick-up locations, past drop-off locations, past entities from which the user has ordered items, etc.). In some implementations, the historical vehicle service usage data can include preferences and/or characteristics associated with past vehicle service request(s)/instance(s). This can include, for example, types of items (e.g., food, etc.) ordered for delivery, types of locations visited (e.g., restaurant, entertainment, work, home, etc.), and/or other information.

As described herein, the vehicle service usage data can be used to determine advertisement content items for a user.

At (508), the method 500 can include determining a first advertisement for a display device positioned on an exterior of a vehicle assigned to the vehicle service instance and a second advertisement for a user device associated with the vehicle service instance. For instance, based on the data associated with the vehicle service instance, a computing system (e.g., an operations computing system) can determine a first advertisement for a display device positioned on an exterior of a vehicle assigned to the vehicle service instance and a second advertisement for a user device associated with the vehicle service instance. The first advertisement content item can correspond to the second advertisement content item such that the first advertisement and the second advertisement content item are associated with a same or similar advertisement subject. In some implementations, the computing system can determine the first advertisement and the second advertisement based on the one or more locations associated with the vehicle service instance.

By way of example, a computing system can process the user's request, match it to a vehicle, and generate a vehicle service instance. The vehicle service instance can indicate one or more locations associated with the requested vehicle service. This can include, for example, a pick-up location, destination location, and/or intermediate location(s). The operations computing system can use the vehicle service instance to determine advertisements that can be displayed to the user via two different formats. For instances, the operations computing system can utilize an advertisement engine to select a first advertisement content item for display via a display device positioned on an exterior of a vehicle assigned to a vehicle service instance. The display device can include a display device located on top of the vehicle (e.g., a cartop display). The operations computing system can also select a second advertisement content item for display via a user device associated with the vehicle service instance. The user device associated with the vehicle service instance can include at least one of: (i) a user device associated with the user, (ii) a user device associated with the vehicle (e.g., an onboard tablet), or (iii) a user device associated with an operator (e.g., a driver) of the vehicle. In some implementations, the user device associated with the user comprises a vehicle service application, and wherein the vehicle service was requested through the vehicle service application The first advertisement content item can correspond to the second advertisement content item such that the first advertisement content item and the second advertisement content item are associated with the same or a similar advertisement subject. Advertisement subjects can include, for example: products, brands, logos, events, companies, locations, cities, travel destinations, goods, services, advertisers, others, etc. By way of example, the first advertisement content item can include a first visual advertisement for a certain drink product that is displayable on the exterior display device of the vehicle. The second advertisement content item can include a second advertisement that includes the same visual advertisement for the drink product or a related advertisement such as, for example, a coupon for the drink product. In some implementations, the coupon can be redeemable through a software application of the service entity. This can be the software application used to request the vehicle service (e.g., for transportation of the user) and/or another software application (e.g., for ordering food delivery).

The advertisement content items can be determined based on the location(s) ("waypoint(s)") associated with the vehicle service instance. For instance, the advertisement content items may be determined based at least in part on a pick-up location or a destination location of the vehicle service instance and/or one or more intermediate locations between the pick-up location and the destination location. This can allow the advertisement content items to be more closely related to the relevant environment in which the user is traveling. By way of example, a user may request a transportation service from a pick-up location to a destination location. The pick-up location may be, for example, the user's workplace. Additionally and/or alternatively, the destination location may be the user's home. Based on these locations and/or other data associated with the vehicle service instance (e.g., time of day, user preferences, etc.), the operations computing system can recognize that the user is returning home after, for example, a day of work. The operations computing system may, thus, determine that the user may be interested in a delivery order for dinner, groceries, etc. Accordingly, the operations computing system can select a first advertisement content item for a restaurant or grocery store to be displayed on the exterior display device of the vehicle and a second advertisement content item for a delivery service whereby the user can order food to be delivered from the restaurant or grocery store via a user's phone. In some implementations, the advertisement content item can be indicative of a restaurant from which the user has previously ordered food using a vehicle delivery service of the service entity. This can be determined based on the data associated with the user, as described herein. In some implementations, the first advertisement content item and/or the second advertisement content item can be based on an intermediate location between the pick-up location and the destination location. For example, the computing system can determine one or more relevant locations (e.g., restaurants) that the user may view while en route from the pick-up location and the destination location. The first advertisement content item and/or the second advertisement content item can be based on the one or more relevant locations. For example, the first advertisement content item and/or the second advertisement content item can be indicative of a restaurant that is viewing, located, etc. between the pick-up and drop-off locations while a user is riding in the vehicle.

In some implementations, the user can interact with the second advertisement content item (e.g., while riding in the vehicle) to initiate a new vehicle service instance by which another vehicle delivers food to the user's home from the restaurant or grocery store. In this way, a vehicle service (e.g., of the current vehicle service instance) can be a service for transporting the user and the new vehicle service instance can include a delivery service.

In some implementations, the second advertisement content item can be or can include a promotional offer. The promotional offer can be redeemable through a vehicle service application on the user device. For instance, in some implementations, the second advertisement content item can display a coupon code, promotional code, discount code, or other similar code. As another example, in some implementations, the second advertisement content item can be interacted with to initiate a promotional offer. For instance, in some implementations, when the user taps on or otherwise interacts with the second advertisement content item, the vehicle service application can apply a promotional offer (e.g., a discount, etc.) to a vehicle service. In some implementations, interaction with the second advertisement content item can initiate a launch of another application (e.g., where the promotional offer can be redeemed). In some implementations, the other application can present a user interface in which an item associated with the second advertisement content item is queued for order (e.g., appears in a cart, etc.).

In some implementations, determining a first advertisement for the display device positioned on the exterior of the vehicle assigned to the vehicle service instance and the second advertisement for the user device associated with the vehicle service instance can include communicating with an advertisement engine. For instance, in some implementations, data associated with a vehicle service instance, such as locations associated with the vehicle service instance, user preferences, time of day, etc. may be communicated to the advertisement engine. The advertisement engine can be configured to determine the first advertisement and/or the second advertisement based on the data associated with the vehicle service instance. In some implementations, the advertisement engine can be associated with (e.g., executed on) a same or similar computing system, and/or a distinct computing system, from a service entity configured to implement the vehicle service. For instance, in some implementations, communication of the first advertisement and/or the second advertisement to the display device and/or user device can be performed by any suitable computing system, such as any intermediate computing systems.

In some implementations, the first advertisement and/or the second advertisement content items can be determined based on one or more locations associated with a vehicle service instance. As an example, in some implementations, the one or more locations can be or can include a pick-up location associated with the vehicle service instance. Additionally and/or alternatively, in some implementations, the one or more locations can be or can include a destination location associated with the vehicle service instance. For instance, the vehicle service instance may provide for movement of a vehicle between a pick-up location and a destination location. The vehicle may pick-up one or more users, one or more goods (e.g., groceries, takeout, etc.), and/or other suitable loads at the pick-up location. Additionally and/or alternatively, the vehicle may drop the load(s) off at the destination location. The one or more locations can additionally and/or alternatively be or include an intermediate location between the pick-up location and the destination location. For instance, the one or more locations can be "waypoints" that correspond to points of interest along or near the path of the vehicle service instance.

As one example, the user may have requested a vehicle service conveying the user from a workplace of the user to a home of the user. The advertisement engine can receive the destination and/or pickup location of the vehicle service instance and determine that the user is heading home from work. The advertisement engine can further determine that the user may be receptive to advertisements for delivery meals. Based on this determination, the user may thus be provided with first and second advertisements corresponding to restaurants. As another example, the user may be picked up from a grocery store. The advertisement engine may thus determine that the user would be receptive to a coupon for free delivery of groceries from that store. Additionally, in some implementations, the advertisement(s) can be determined based at least in part on locations associated with the vehicle service instance. For instance, the advertisements may be determined based at least in part on a pick-up location or a destination location of the vehicle service instance and/or one or more intermediate locations between the pick-up location and the destination location.

At (510), the method 500 can include communicating data that initiates display of the first advertisement for the display device positioned on the exterior of the vehicle assigned to the vehicle service instance. For instance, the computing system can communicate data that initiates the display of the first advertisement content item for the display device positioned on the exterior of the vehicle assigned to the vehicle service instance. In some implementations, communicating the data that initiates the display of the first advertisement can include communicating the data that initiates the display of the first advertisement such that the first advertisement is displayed prior to the vehicle arriving at a pick-up location associated with the vehicle service instance. In some implementations, the first advertisement may be displayed prior to the vehicle arriving at the pickup location such that the first advertisement is visible to the user (and/or other bystanders) as the vehicle arrives at the pickup location. For instance, the computing system can monitor the location of the vehicle based on location data (e.g., GPS data) from a user device of the vehicle and/or other operator. The computing system can determine a time/time range or position/position range at which to initiate the display of the first advertisement content item based on the location data. The computing system can send instructions to the exterior display device of the vehicle and/or to another intermediate system (e.g., advertisement service) to initiate the display at the determined time/time range or position/position range.

Additionally and/or alternatively, in some implementations, communicating the data that initiates the display of the first advertisement content item can include communicating the data that initiates the display of the first advertisement content item such that the first advertisement content item is displayed prior to the user boarding the vehicle. For instance, the first advertisement content item may be displayed such that the user is able to view the advertisement (e.g., for a drink product) prior to boarding the vehicle. Any suitable method may be used in accordance with example aspects of the present disclosure to determine that the user has boarded the vehicle. For example, the user device of the user, the driver, and/or the vehicle may be provided with an interface element that, when interacted with, confirms the presence of the user in the vehicle. As another example, the user may be determined to have boarded the vehicle based at least in part on one or more sensors. As another example, in some implementations, the user may be considered to have boarded the vehicle once the vehicle resumes motion. As used herein, boarding refers to the presence of the user in the vehicle. The computing system (e.g., operations computing system) can monitor state changes of the applications, data provided by the user device, location data, sensor data, etc. to determine that the user has boarded the vehicle.

As one example, in some implementations, communicating data that initiates display of the first advertisement can include determining that the vehicle is within an ad target range of the pick-up location associated with the vehicle service instance. As an example, in some implementations, the advertisement may be displayed when the vehicle is within the ad target range as indicative that the user is likely to be able to view the advertisement when the vehicle is within the ad target range. The ad target range can be any suitable range, such as a fixed range, a range determined based on information about the vehicle service instance, etc. Based on determining that the vehicle is within the ad target range of the pick-up location, the data that initiates display of the first advertisement can be communicated. As another example, certain types of advertisements may be restricted based on types of nearby locations of the vehicle (e.g., within a school zone).

At (512), the method 500 can include communicating data that initiates the display of the second advertisement for the user device associated with the vehicle service instance. For instance, in some implementations, the operations computing system can also select a second advertisement content item for display via a user device associated with the vehicle service instance (e.g., the user's mobile phone, an onboard tablet, etc.). The second advertisement content item can include a same visual advertisement for the drink product or a related advertisement such as, for example, a coupon for the drink product. In some implementations, the coupon can be redeemable through a software application of the service entity. This can be the software application used to request the vehicle service (e.g., for transportation of the user) and/or another software application (e.g., for ordering food delivery).

In some implementations, the second advertisement can be displayed once the user has boarded the vehicle. For example, as described herein, the computing system can determine that the user has boarded the vehicle. The computing system can communicate the data that initiates the display of the second advertisement based on determining that the user has boarded the vehicle. This can allow the user to view corresponding advertisement content in an out-of-form manner (e.g., the exterior display device of the vehicle) and in-form (e.g., via the application of the user device) at two different times to improve messaging.

The computing system can apportion revenue generated by displaying the advertisement content item(s). For example, at least a portion of the revenue generated from displaying the advertisement content item(s) can be provided to the operator (e.g., deposited into a linked account). At least a portion of the revenue generated from displaying the advertisement content item(s) can be provided to the user by, for example, reducing the cost of a current or future vehicle service to the user.

Figure 6:
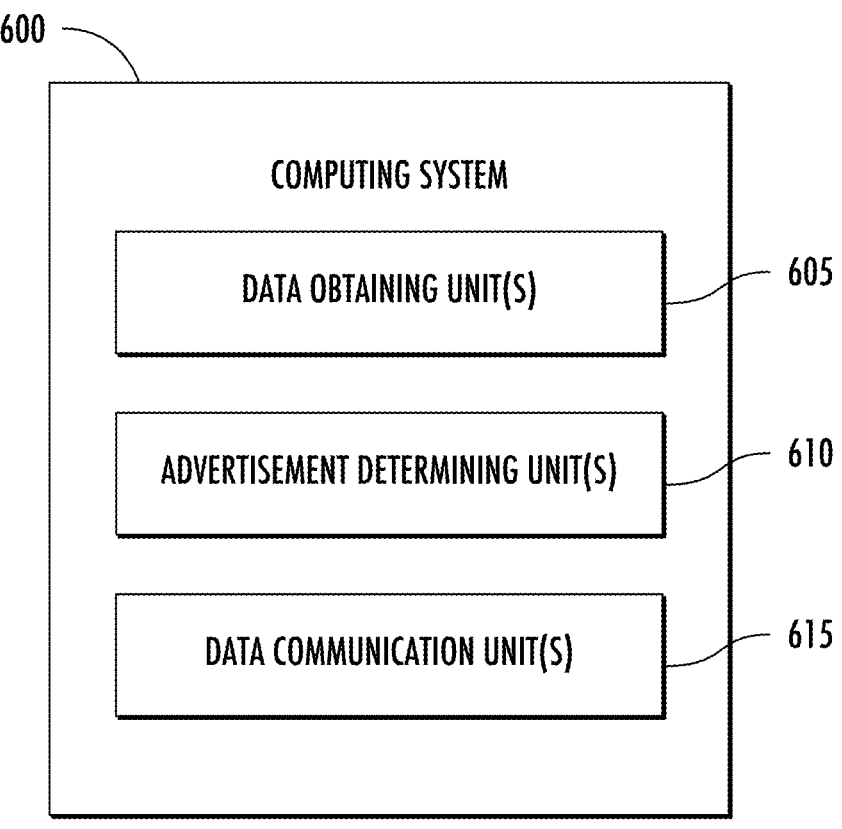
FIG. 6 depicts a block diagram of an example system for displaying advertisements to a user of a vehicle service according to example embodiments of the present disclosure.

FIG. 6 depicts a block diagram of an example system for determining and electronically displaying advertisement content to a user of a vehicle service through a set of distributed electronic devices according to example embodiments of the present disclosure. Various means can be configured to perform the methods and processes described herein. For example, computing system 600 of FIG. 6 can include data obtaining unit(s) 605, advertisement determining unit(s) 610, data communication unit(s) 615, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims). For instance, the means can be configured to obtain data associated with a vehicle service request or a vehicle service instance. As described herein, the vehicle service instance can be associated with a request for a vehicle service for a user and the data associated with the vehicle service instance can include one or more locations associated with the vehicle service. The means can be configured to obtain other types of data such as, for example, location data, data associated with a user (e.g., historical vehicle service usage data, etc.). The data obtaining unit(s) 605 are one example of means for obtaining data, as described herein.

The means can be configured to determine advertisement content items for display to a user of the vehicle. For instance, the means can be configured to determine, based on the data associated with a vehicle service request/instance, a first advertisement content item for a display device positioned on an exterior of a vehicle assigned to the vehicle service instance and a second advertisement content item for a user device associated with the vehicle service instance. As described herein, the first advertisement content item can correspond to the second advertisement content item such that the first advertisement and the second advertisement content item are associated with a same or similar advertisement subject. In some implementations, the first advertisement and the second advertisement can be determined based on the one or more locations associated with the vehicle service instance. The means can be configured to communicate with an advertisement engine/service to determine advertisement content item(s). The advertisement determination unit(s) 610 are one example of a means for determining advertisement content item(s), as described herein.

The means can be configured to communicate data indicative of the advertisement content items. For instances, the means can be configured to communicate data that initiates the display of the first advertisement content item for the display device positioned on the exterior of the vehicle assigned to the vehicle service instance. The means can be configured to communicate data that initiates the display of the second advertisement content item for the user device associated with the vehicle service instance. Communication can be direct to the display device positioned on the exterior of the vehicle or the to the user device, or via an intermediate computing system (e.g., associated with an advertisement service). The data communication unit(s) 615 are one example of a means for communicating data as described herein.

Figure 7:
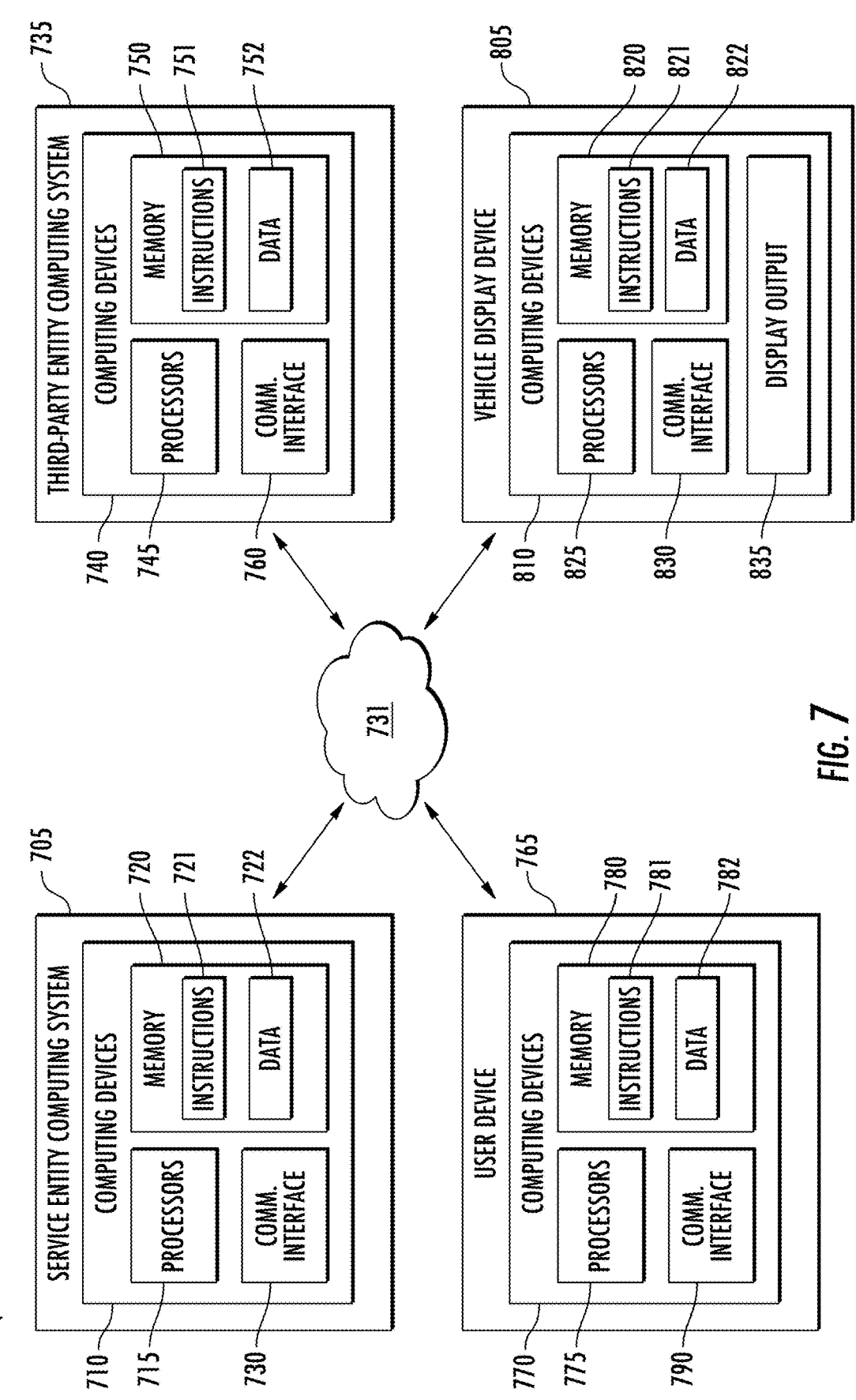
FIG. 7 depicts a block diagram of an example system for implementing systems and methods according to example embodiments of the present disclosure.

FIG. 7 depicts a block diagram of an example system 700 for implementing systems and methods according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include a service entity computing system 705 (e.g., that is associated with a service entity). The example system 700 can include a third-party entity computing system 735 (e.g., that is associated with a third-party entity such as an advertisement service/engine). The example system 700 can include a user device 765 (e.g., user device of the user, user device of the operator, user device of the vehicle). The example system 700 can include a vehicle display device (e.g., a display device positioned on the exterior of a vehicle). One or more of the service entity computing system 705, the third-party entity computing system 735, the user device 765, or the vehicle display device can be communicatively coupled to one another over one or more communication network(s) 731. The networks 731 can correspond to any of the networks described herein.

The computing device(s) 710 of the service entity computing system 705 can include processor(s) 715 and a memory 720. The one or more processors 715 can be any suitable processing device (e.g., a processor core, a microprocessor, an ASIC, a FPGA, a controller, a microcontroller, etc.) and can be one processor or a plurality of processors that are operatively connected. The memory 720 can include one or more non-transitory computer-readable storage media, such as RAM, ROM, EEPROM, EPROM, one or more memory devices, flash memory devices, data registrar, etc., and combinations thereof.

The memory 720 can store information that can be accessed by the one or more processors 715. For example, the memory 720 (e.g., one or more non-transitory computer-readable storage mediums, memory devices) can include computer-readable instructions 721 that can be executed by the one or more processors 715. The instructions 721 can be software written in any suitable programming language or can be implemented in hardware. Additionally, or alternatively, the instructions 721 can be executed in logically and/or virtually separate threads on processor(s) 715.

For example, the memory 720 can store instructions 721 that when executed by the one or more processors 715 cause the one or more processors 715 (the service entity computing system 705) to perform operations such as any of the operations and functions of the computing system(s) (e.g., operations computing system) described herein (or for which the system(s) are configured), one or more of the operations and functions for communicating between the computing systems, one or more portions/operations of method 500, and/or one or more of the other operations and functions of the computing systems described herein.

The memory 720 can store data 722 that can be obtained (e.g., acquired, received, retrieved, accessed, created, stored, etc.). The data 722 can include, for example, any of the data/information described herein. In some implementations, the computing device(s) 710 can obtain data from one or more memories that are remote from the service entity computing system 705.

The computing device(s) 710 can also include a communication interface 730 used to communicate with one or more other system(s) remote from the service entity computing system 705, such as third-party entity computing system 735, user device 765, and/or vehicle display device 805. The communication interface 730 can include any circuits, components, software, etc. for communicating via one or more networks (e.g., network(s) 731). The communication interface 730 can include, for example, one or more of a communications controller, receiver, transceiver, transmitter, port, conductors, software and/or hardware for communicating data.

The third-party entity computing system 735 can include one or more computing device(s) 740 that are remote from the service entity computing system 705, the user device 765, and the vehicle display device 805. The computing device(s) 740 can include one or more processors 745 and a memory 750. The one or more processors 745 can be any suitable processing device (e.g., a processor core, a microprocessor, an ASIC, a FPGA, a controller, a microcontroller, etc.) and can be one processor or a plurality of processors that are operatively connected. The memory 750 can include one or more tangible, non-transitory computer-readable storage media, such as RAM, ROM, EEPROM, EPROM, one or more memory devices, flash memory devices, data registrar, etc., and combinations thereof.

The memory 750 can store information that can be accessed by the one or more processors 745. For example, the memory 750 (e.g., one or more tangible, non-transitory computer-readable storage media, one or more memory devices, etc.) can include computer-readable instructions 751 that can be executed by the one or more processors 745. The instructions 751 can be software written in any suitable programming language or can be implemented in hardware. Additionally, or alternatively, the instructions 751 can be executed in logically and/or virtually separate threads on processor(s) 745.

For example, the memory 750 can store instructions 751 that when executed by the one or more processors 745 cause the one or more processors 745 to perform operations such as any of the operations and functions of the computing system(s) (e.g., advertisement server) described herein (or for which the system(s) are configured), one or more of the operations and functions for communicating between computing systems, one or more operations/portions of method 500, and/or one or more of the other operations and functions of the computing systems described herein. The memory 750 can store data 752 that can be obtained. The data 752 can include, for example, any of the data/information described herein.

The computing device(s) 740 can also include a communication interface 760 used to communicate with one or more system(s) that are remote from the system 735. The communication interface 760 can include any circuits, components, software, etc. for communicating via one or more networks (e.g., network(s) 731). The communication interface 760 can include, for example, one or more of a communications controller, receiver, transceiver, transmitter, port, conductors, software and/or hardware for communicating data.

The user device 765 can include one or more computing device(s) 770 that are remote from the service entity computing system 705, the third-party entity computing system 735, and the vehicle display device 805. The computing device(s) 770 can include one or more processors 775 and a memory 780. The one or more processors 775 can be any suitable processing device (e.g., a processor core, a microprocessor, an ASIC, a FPGA, a controller, a microcontroller, etc.) and can be one processor or a plurality of processors that are operatively connected. The memory 780 can include one or more tangible, non-transitory computer-readable storage media, such as RAM, ROM, EEPROM, EPROM, one or more memory devices, flash memory devices, data registrar, etc., and combinations thereof.

The memory 780 can store information that can be accessed by the one or more processors 775. For example, the memory 780 (e.g., one or more tangible, non-transitory computer-readable storage media, one or more memory devices, etc.) can include computer-readable instructions 781 that can be executed by the one or more processors 775. The instructions 781 can be software written in any suitable programming language or can be implemented in hardware. Additionally, or alternatively, the instructions 781 can be executed in logically and/or virtually separate threads on processor(s) 775.

For example, the memory 780 can store instructions 781 that when executed by the one or more processors 775 cause the one or more processors 775 to perform operations such as any of the operations and functions of the computing system(s) (e.g., user devices) described herein (or for which the user device(s) are configured), one or more of the operations and functions for communicating between systems, one or more operations/portions of methods 500, and/or one or more of the other operations and functions of the computing systems described herein. The memory 780 can store data 782 that can be obtained. The data 782 can include, for example, any of the data/information described herein.

The computing device(s) 770 can also include a communication interface 790 used to communicate computing device/system that is remote from the user device 765, such as third-party entity computing system 735, service entity computing system 705, or vehicle display device 805. The communication interface 790 can include any circuits, components, software, etc. for communicating via one or more networks (e.g., network(s) 731). The communication interface 790 can include, for example, one or more of a communications controller, receiver, transceiver, transmitter, port, conductors, software and/or hardware for communicating data.

The computing device(s) 810 of the vehicle display device 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 825. For example, the memory 820 (e.g., one or more non-transitory computer-readable storage mediums, memory devices) can include computer-readable instructions 821 that can be executed by the one or more processors 825. The instructions 821 can be software written in any suitable programming language or can be implemented in hardware. Additionally, or alternatively, the instructions 821 can be executed in logically and/or virtually separate threads on processor(s) 825.

For example, the memory 820 can store instructions 821 that when executed by the one or more processors 815 cause the one or more processors 815 (the vehicle display device 805) to perform operations such as any of the operations and functions of the display device(s) described herein (or for which such devices are configured), one or more of the operations and functions for communicating between the computing systems/devices, one or more portions/operations of method 500, and/or one or more of the other operations and functions of the computing systems described herein.

The memory 820 can store data 822 that can be obtained (e.g., acquired, received, retrieved, accessed, created, stored, etc.). The data 822 can include, for example, any of the data/information described herein. In some implementations, the computing device(s) 810 can obtain data from one or more memories that are remote from the vehicle display device 805.

The computing device(s) 810 can also include a communication interface 830 used to communicate with one or more other system(s) remote from the vehicle display device 805, such as third-party entity computing system 735, user device 765, and/or service entity computing system 705. The communication interface 830 can include any circuits, components, software, etc. for communicating via one or more networks (e.g., network(s) 731). The communication interface 830 can include, for example, one or more of a communications controller, receiver, transceiver, transmitter, port, conductors, software and/or hardware for communicating data.

The vehicle display device can include a display output 835. The display output 835 can be any type of display including, for example, a cartop display device, liquid crystal display (LCD), liquid emitting diode display (LED), organic light emitting diode (OLED), plasma monitor, cathode ray tube (CRT), display screen, monitor, television, or any other suitable display device.

The network(s) 731 can be any type of network or combination of networks that allows for communication between devices. In some implementations, the network(s) 731 can include one or more of a local area network, wide area network, the Internet, secure network, cellular network, mesh network, peer-to-peer communication link and/or some combination thereof and can include any number of wired or wireless links. Communication over the network(s) 731 can be accomplished, for example, via a communication interface using any type of protocol, protection scheme, encoding, format, packaging, etc.

Computing tasks discussed herein as being performed at certain computing device(s)/systems can instead be performed at another computing device/system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some implementations are described with a reference numeral for example illustrated purposes and is not meant to be limiting.

Although claims included herein may be shown to be dependent on other certain claims, any of the claims can depend on one or more other claims, including any preceding claims.

What is claimed is:

1. A computing system comprising:

one or more processors; and one or more non-transitory, computer-readable media storing instructions that are executable by the one or more processors to cause the computing system to perform operations, the operations comprising:

obtaining data associated with a request for a vehicle service for a user; generating data associated with a vehicle service instance based on the request for the vehicle service for the user, wherein the data associated with the vehicle service instance is indicative of one or more locations associated with the vehicle service; generating, by a machine-learned model trained on historic data, a predicted user intention, wherein the machine-learned model determines the predicted user intention by: obtaining input data comprising the data indicative of the one or more locations associated with the vehicle service and time data as input; and generating the predicted user intention based on the obtained input data; based on the data associated with the vehicle service instance and the predicted user intentiontt, determining a first advertisement content item for a display device positioned onboard a vehicle assigned to the vehicle service instance; based on determining the first advertisement content item for the display device positioned onboard the vehicle assigned to the vehicle service, determining a second advertisement content item that is related to the first advertisement content item for display via a user device associated with the vehicle service instance; communicating data that initiates the display of the first advertisement content item for the display device positioned onboard the vehicle assigned to the vehicle service instance;

determining that the user has entered, or will enter, the vehicle based on at least one of: obtaining motion data associated with the vehicle indicative of the vehicle resuming motion; or obtaining sensor data from the vehicle or user device; and in response to determining that the user has entered, or will enter, the vehicle, communicating data that initiates the display of the second advertisement content item for the user device associated with the vehicle service instance.

2. The computing system of claim 1, wherein the display device positioned onboard the vehicle comprises a display device positioned on an exterior of the vehicle.

3. The computing system of claim 2, the operations comprising:

obtaining location data transmitted via the user device of a driver of the vehicle, the location data being based on GPS-signals and indicative of a location of the vehicle; and based on the location data, communicating data that initiates the display of the first advertisement content item for the display device positioned on the exterior of the vehicle, wherein the first advertisement content item is visible on the display as the vehicle arrives to a location associated with the vehicle service.

4. The computing system of claim 1, the operations comprising:

based on determining the first advertisement content item for the display device positioned onboard the vehicle assigned to the vehicle service, determining the second advertisement content item that is related to the first advertisement content item for display via the user device associated with the vehicle service instance, wherein the second advertisement content item comprises an interactive promotional offer;

obtaining data indicative of the user selecting the interactive promotional offer; and in response to obtaining data indicative of the user selecting the interactive promotional offer, initiating a launch of an application where the interactive promotional offer can be redeemed.

5. The computing system of claim 4, wherein the second advertisement content item comprises an advertisement content item for a same product of the first advertisement content item and an adjusted component.

6. The computing system of claim 5, wherein the adjusted component comprises a discount code.

7. The computing system of claim 5, wherein the adjusted component comprises an item to order.

8. A computer-implemented method, comprising: obtaining data associated with a request for a vehicle service for a user; generating data associated with a vehicle service instance based on the request for the vehicle service for the user, wherein the data associated with the vehicle service instance is indicative of one or more locations associated with the vehicle service; generating, by a machine-learned model trained on historic data, a predicted user intention, wherein the machine-learned model determines the predicted user intention by: obtaining input data comprising the data indicative of the one or more locations associated with the vehicle service and time data as input; and generating the predicted user intention based on the obtained input data; based on the data associated with the vehicle service instance and the predicted user intention, determining a first advertisement content item for a display device positioned onboard a vehicle assigned to the vehicle service instance; based on determining the first advertisement content item for the display device positioned onboard the vehicle assigned to the vehicle service, determining a second advertisement content item that is related to the first advertisement content item for display via a user device associated with the vehicle service instance; communicating data that initiates the display of the first advertisement content item for the display device positioned onboard the vehicle assigned to the vehicle service instance; determining that the user has entered, or will enter the vehicle based on at least one of: obtaining motion data associated with the vehicle indicative of the vehicle resuming motion; or obtaining sensor data from the vehicle or user device; and in response to determining that the user has entered, or will enter, the vehicle, communicating data that initiates the display of the second advertisement content item for the user device associated with the vehicle service instance.

9. The computer-implemented method of claim 8, wherein the display device positioned onboard the vehicle comprises a display device positioned on an exterior of the vehicle.

10. The computer-implemented method of claim 9, comprising:

obtaining location data transmitted via the user device of a driver of the vehicle, the location data being based on GPS-signals and indicative of a location of the vehicle; and based on the location data, communicating data that initiates the display of the first advertisement content item for the display device positioned on the exterior of the vehicle, wherein the first advertisement content item is visible on the display as the vehicle arrives to a location associated with the vehicle service.

11. The computer-implemented method of claim 10, wherein the second advertisement content item comprises an advertisement content item for a same product of the first advertisement content item and an adjusted component.

12. The computer-implemented method of claim 10, comprising:

based on determining the first advertisement content item for the display device positioned onboard the vehicle assigned to the vehicle service, determining the second advertisement content item that is related to the first advertisement content item for display via the user device associated with the vehicle service instance, wherein the second advertisement content item comprises an interactive promotional offer; obtaining data indicative of the user selecting the interactive promotional offer; and in response to obtaining data indicative of the user selecting the interactive promotional offer, initiating a launch of an application where the interactive promotional offer can be redeemed.

13. One or more non-transitory computer readable media storing instructions that are executable by one or more processors to perform operations comprising: obtaining data associated with a request for a vehicle service for a user; generating data associated with a vehicle service instance based on the request for the vehicle service for the user, wherein the data associated with the vehicle service instance is indicative of one or more locations associated with the vehicle service; generating, by a machine-learned model trained on historic data, a predicted user intention, wherein the machine-learned model determines the predicted user intention by: obtaining input data comprising the data indicative of the one or more locations associated with the vehicle service and time data as input; and generating the predicted user intention based on the obtained input data; based on the data associated with the vehicle service instance and the predicted user intention, determining a first advertisement content item for a display device positioned onboard a vehicle assigned to the vehicle service instance; based on determining the first advertisement content item for the display device positioned onboard the vehicle assigned to the vehicle service, determining a second advertisement content item that is related to the first advertisement content item for display via a user device associated with the vehicle service instance; determining that the user has entered or will enter, the vehicle based on at least one of: obtaining motion data associated with the vehicle indicative of the vehicle resuming motion; or obtaining sensor data from the vehicle or user device; and in response to determining that the user has entered, or will enter, the vehicle, communicating data that initiates the display of the first advertisement content item for the display device positioned onboard the vehicle assigned to the vehicle service instance; and communicating data that initiates the display of the second advertisement content item for the user device associated with the vehicle service instance.

14. The one or more non-transitory computer-readable media of claim 13, wherein the display device positioned onboard the vehicle comprises a display device positioned on an exterior of the vehicle.

15. The one or more non-transitory computer-readable media of claim 14, the operations comprising:

obtaining location data transmitted via the user device of a driver of the vehicle, the location data being based on GPS-signals and indicative of a location of the vehicle; and based on the location data, communicating data that initiates the display of the first advertisement content item for the display device positioned on the exterior of the vehicle, wherein the first advertisement content item is visible on the display as the vehicle arrives to a location associated with the vehicle service.

16. The one or more non-transitory computer readable media of claim 14, the operations comprising:

based on determining the first advertisement content item for the display device positioned onboards the vehicle assigned to the vehicle service, determining the second advertisement content item that is related to the first advertisement content item for display via the user device associated with the vehicle service instance, wherein the second advertisement content item comprises an interactive promotional offer;

obtaining data indicative of the user selecting the interactive promotional offer; and in response to obtaining data indicative of the user selecting the interactive promotional offer, initiating a launch of an application where the interactive promotional offer can be redeemed.

17. The one or more non-transitory computer readable media of claim 16, wherein the second advertisement content item comprises an advertisement content item for a same product of the first advertisement content item and an adjusted component.

\* \* \* \* \*